United States Patent
Abraham et al.

(10) Patent No.: US 12,512,219 B2
(45) Date of Patent: Dec. 30, 2025

(54) SYSTEMS AND METHODS FOR MEDICAL DEVICE USAGE MANAGEMENT

(71) Applicant: WEST PHARMACEUTICAL SERVICES, INC., Exton, PA (US)

(72) Inventors: Silji Abraham, Southfield, MI (US); Nakul Subramaniyan, King of Prussia, PA (US); David Martin, Royersford, PA (US); Abhijit Jana, PBEL City Hyderabad (IN); Naresh Podishetty, Suchitra Hyderabad (IN); Aditya Bhattacharya, Kolkata (IN); Ranganathan Raju, Udumalaipettai (IN)

(73) Assignee: West Pharmaceutical Services, Inc., Exton, PA (US)

( * ) Notice: Subject to any disclaimer, the term of this patent is extended or adjusted under 35 U.S.C. 154(b) by 2 days.

(21) Appl. No.: 17/775,568

(22) PCT Filed: Nov. 12, 2020

(86) PCT No.: PCT/US2020/060102
§ 371 (c)(1),
(2) Date: May 9, 2022

(87) PCT Pub. No.: WO2021/097007
PCT Pub. Date: May 20, 2021

(65) Prior Publication Data
US 2022/0375599 A1    Nov. 24, 2022

(30) Foreign Application Priority Data
Nov. 13, 2019 (IN) .............................. 201921046143

(51) Int. Cl.
*G16H 40/67* (2018.01)
*G16H 20/17* (2018.01)

(52) U.S. Cl.
CPC .............. *G16H 40/67* (2018.01); *G16H 20/17* (2018.01)

(58) Field of Classification Search
None
See application file for complete search history.

(56) References Cited

U.S. PATENT DOCUMENTS

| 9,980,140 | B1 | 5/2018 | Spencer et al. |
| 2008/0119705 | A1* | 5/2008 | Patel ...................... G16H 15/00 600/347 |
| 2008/0154957 | A1* | 6/2008 | Taylor .................... H04L 67/34 |

(Continued)

FOREIGN PATENT DOCUMENTS

| WO | 2016/007935 A2 | 1/2016 |
| WO | 2019/199632 A1 | 10/2019 |

*Primary Examiner* — John A Pauls
(74) *Attorney, Agent, or Firm* — Blank Rome LLP

(57) ABSTRACT

Systems and methods for medical device usage management are disclosed. In an example method, an indication that an injection was administered to a patient by a medical device can be received. The indication may be received wirelessly from the medical device. One or more measurements of a physiological characteristic of the patient captured by a sensor associated with the patient can also be received. The indication that the injection was administered to the patient by the injector and the one or more measurements of the physiological characteristic of the patient can then be transmitted.

19 Claims, 23 Drawing Sheets

(56) References Cited

U.S. PATENT DOCUMENTS

| | | | |
|---|---|---|---|
| 2009/0254037 A1* | 10/2009 | Bryant, Jr. | G16H 20/17 |
| | | | 700/282 |
| 2010/0082444 A1* | 4/2010 | Lin | G06Q 20/204 |
| | | | 235/383 |
| 2016/0132660 A1* | 5/2016 | Barajas | G16H 30/40 |
| | | | 705/2 |
| 2016/0331284 A1* | 11/2016 | Pace | A61B 5/14503 |
| 2017/0286638 A1* | 10/2017 | Searle | G16H 40/63 |
| 2018/0250093 A1* | 9/2018 | Frushour | A61B 90/98 |
| 2019/0131010 A1* | 5/2019 | Bengtsson | G16H 50/50 |
| 2019/0307957 A1* | 10/2019 | Worden | A61M 5/1723 |
| 2019/0350470 A1* | 11/2019 | Khachaturian | A61B 5/01 |
| 2020/0345587 A1* | 11/2020 | Aon | A61B 5/14532 |

\* cited by examiner

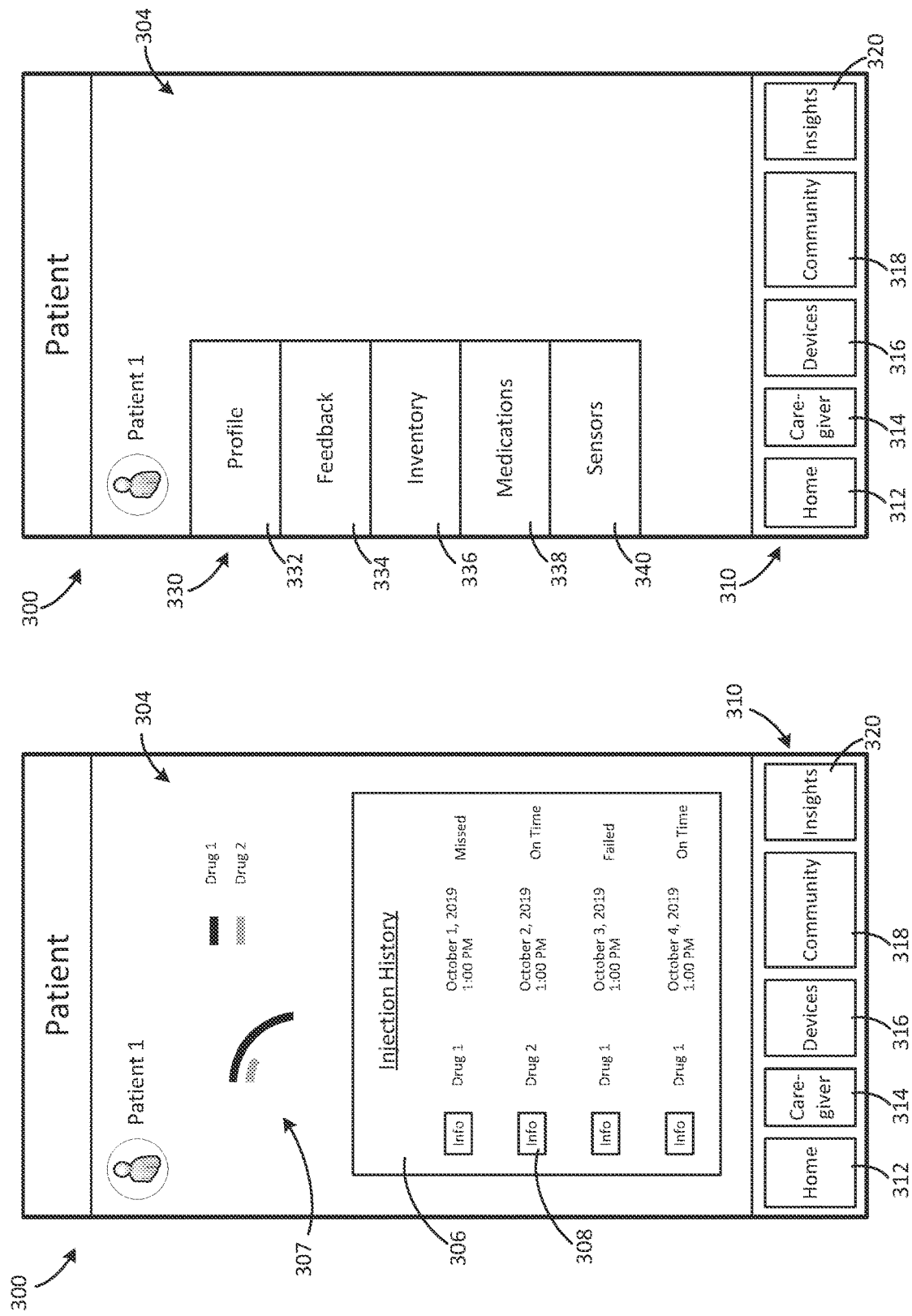

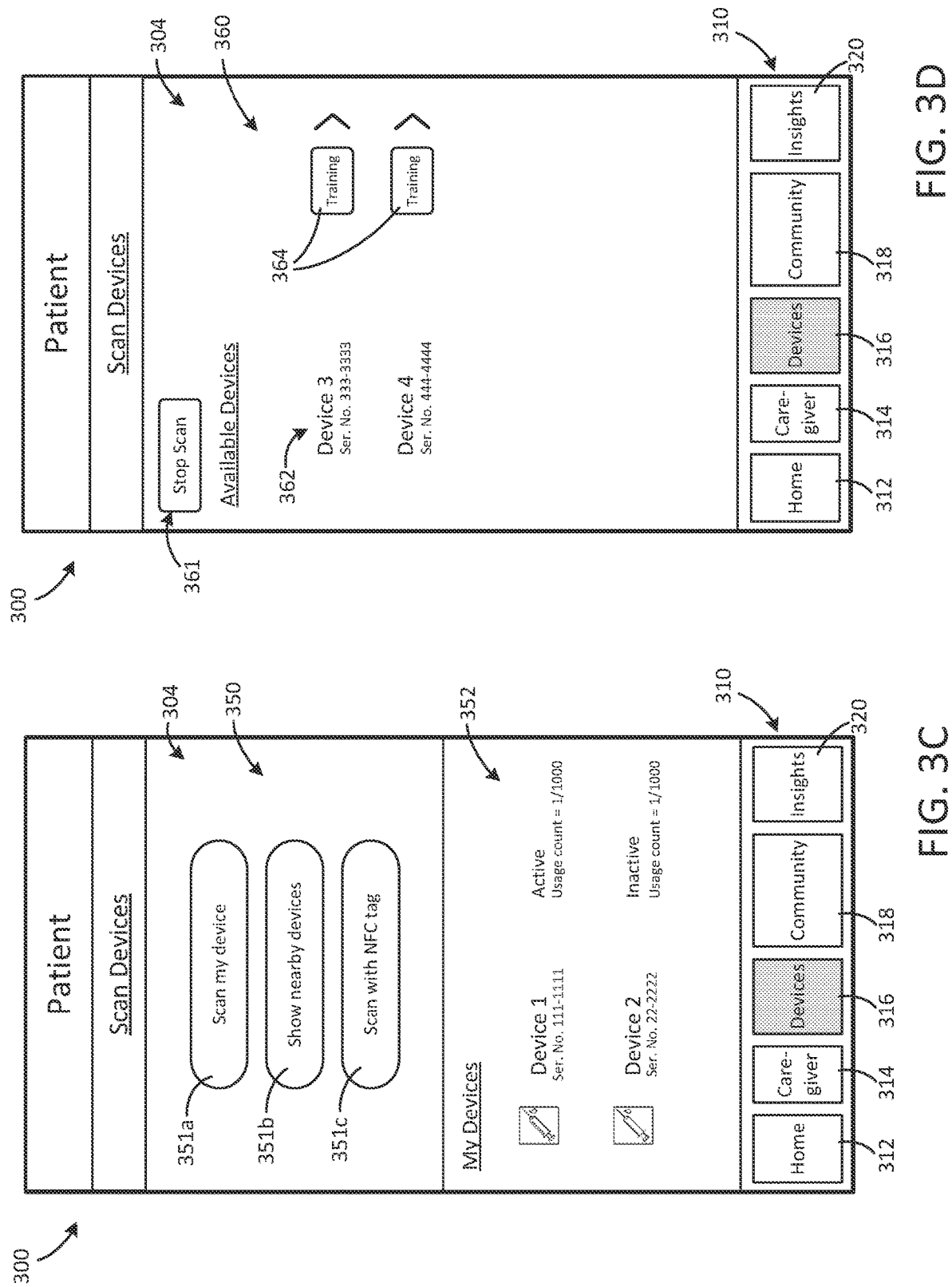

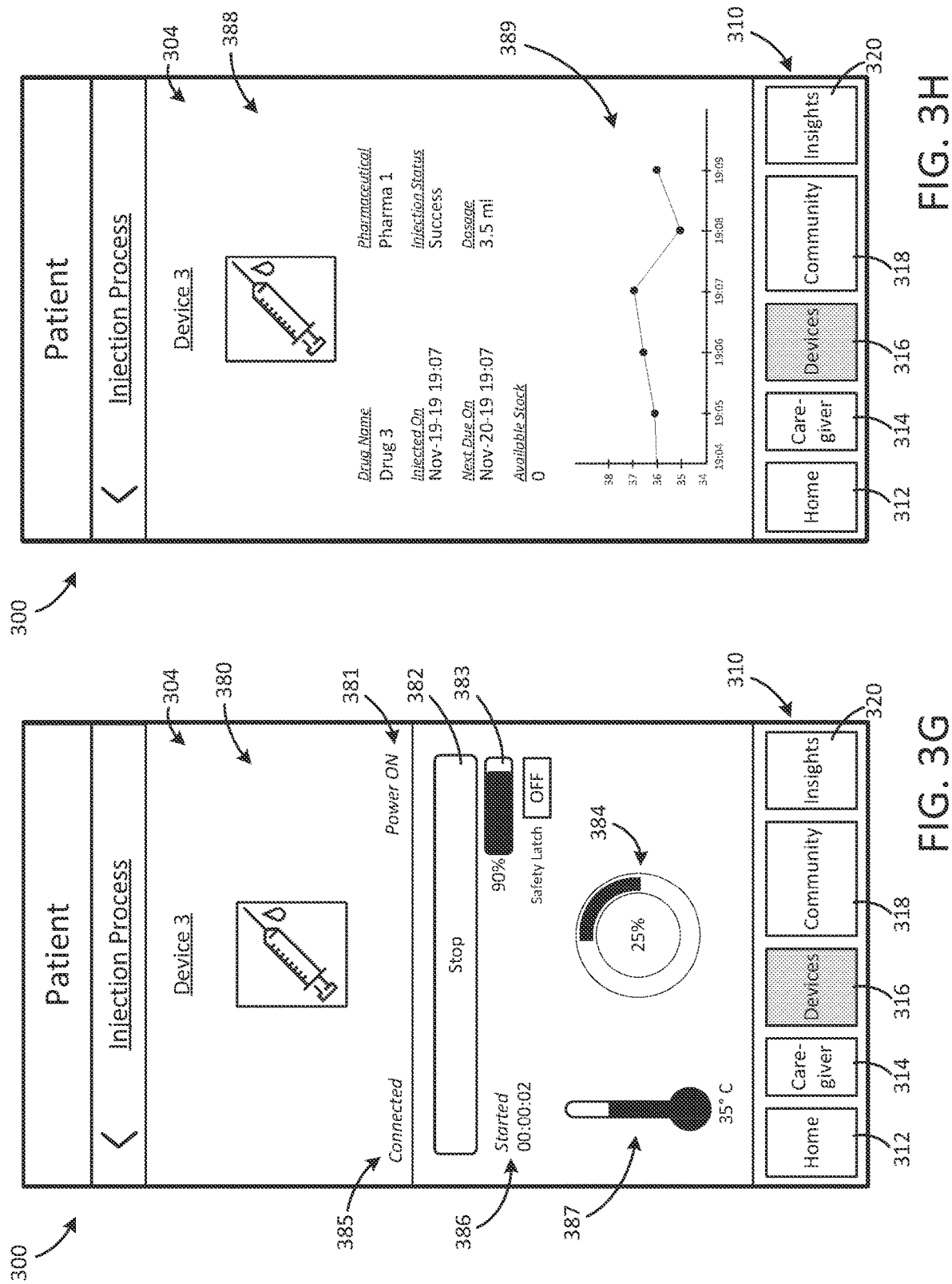

SYSTEMS AND METHODS FOR MEDICAL DEVICE USAGE MANAGEMENT

CROSS-REFERENCE TO RELATED APPLICATIONS

This application is a National Stage of International Patent Application No. PCT/US2020/060102, filed on Nov. 12, 2020, which claims priority to Indian Application No. 201921046143, filed Nov. 13, 2019, the entire contents of which are incorporated by reference herein.

TECHNICAL FIELD

This disclosure generally relates to medical devices and, more particularly, to medical device usage management.

BACKGROUND

In some medical conditions, a patient is prescribed a regimen of regularly-scheduled injections. Rather than receiving the injection in a doctor's office or hospital, a patient may often use an injector device, such as one that adheres to the patient's body or is manually held by the patient. In some configurations, the patient is required only to press a button on the injector to initiate the injection. Yet while this affords convenience to the patient in the moment, it does little to help the patient track his or her overall success in performing a scheduled injection or adherence to an overall injection regiment. Nor does it provide any upstream data to the patient's caregivers, healthcare providers, or other interested parties. For example, a physician's efforts to treat the patient may be hampered due to a lack of reliable, objective information on the patient's adherence to the prescribed schedule.

These and other shortcomings are addressed in the present disclosure.

SUMMARY

Disclosed herein are system and methods for medical device usage management. In an example method, an indication that an injection was administered to a patient by a medical device can be received. The indication may be received wirelessly from the medical device. One or more measurements of a physiological characteristic of the patient captured by a sensor associated with the patient can also be received. The indication that the injection was administered to the patient by the medical device and the one or more measurements of the physiological characteristic of the patient can then be transmitted.

Implementations of any of the described techniques may include a method or process, an apparatus, a device, a machine, a system, or instructions stored on a non-transitory computer-readable storage device. The details of particular implementations are set forth in the accompanying drawings and description below. Other features will be apparent from the following description, including the drawings, and the claims.

BRIEF DESCRIPTION OF DRAWINGS

The accompanying drawings, which are incorporated in and constitute a part of this specification, illustrate embodiments and together with the description, serve to explain the principles of the methods and systems:

FIGS. 3A-H, 4A-C, 5A-B, 6A-D, 7A-E, and 8A-C illustrate example user interfaces according to an embodiment of the present disclosure.

Aspects of the disclosure will now be described in detail with reference to the drawings, wherein like reference numbers refer to like elements throughout, unless specified otherwise.

DETAILED DESCRIPTION

The systems and methods of the present disclosure relate to management of medical device usage. For example, the system and methods of the present disclosure relate to management of injection activity. Such injection activity may be performed by an auto-injector or wearable injector adhered to a patient's body, for example. Indications that the injections were administered to the patient by the injector and physiological measurements of the patient may be collected during the injection process. The injection activity data indicating the injection and associated measurements may be transmitted to a server for processing.

The server may implement a multi-profile platform for users to view and analyze the injection activity data in various forms according to a user's profile (patient, healthcare provider, caregiver, payor, medical device manufacturer, and pharmaceutical company). For example, a patient module may display a future schedule for a patient's injections, as well as a past schedule reflecting the patient's adherence (or lack thereof). As another example, a device manufacturer module may display various statistics relating to numerous patients' usage of an instant device manufacturer's injector. The platform may additionally or alternatively provide communication mechanisms for parties to exchange messages, including parties of the same profile (e.g., between healthcare providers) and parties of different profiles (e.g., between patients and healthcare providers). The platform provides numerous other functions, as will be described more fully herein.

Figure 1:
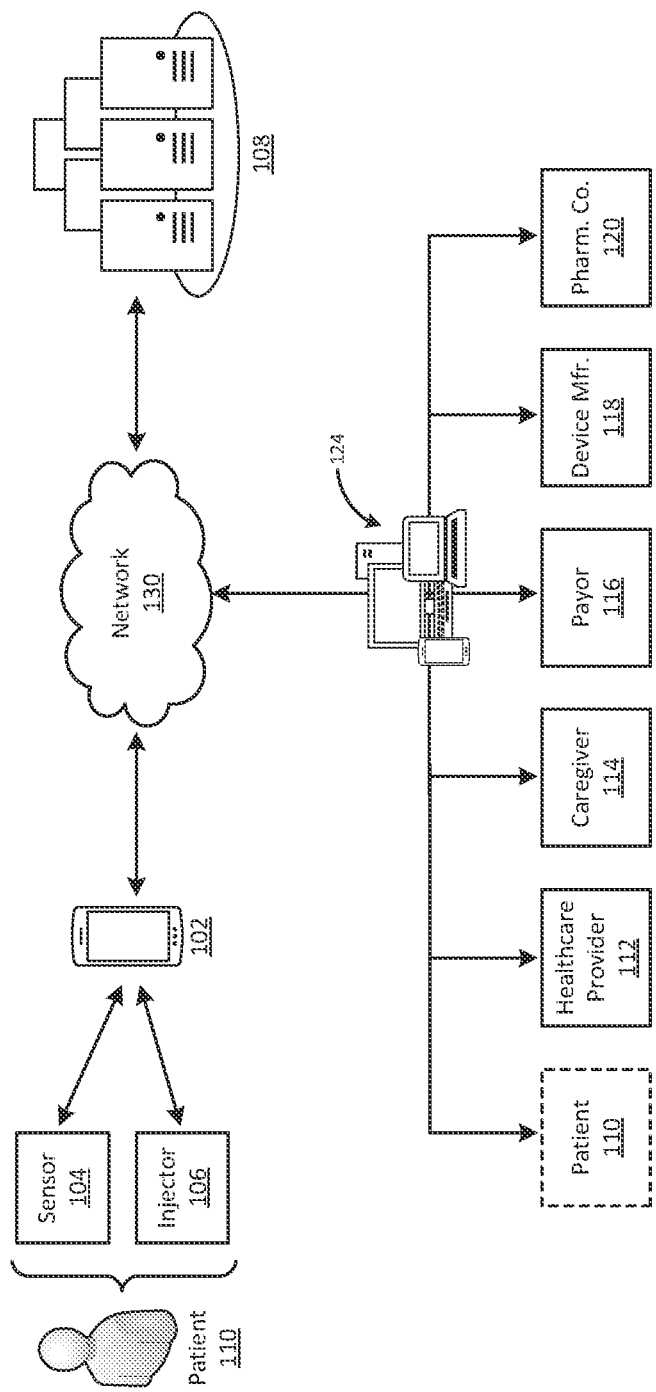
FIG. 1 illustrates an example system and network configuration according to an embodiment of the present disclosure.

FIG. 1 illustrates an example system and network configuration in which the techniques described herein for medical device usage management may be implemented. A patient 110 may use an injector 106 to administer medication to him or herself. In conjunction with the injection, a sensor 104 at the patient 110 may capture one or more measurements of a physiological characteristic of the patient 110. A mobile device 102 associated with the patient 110 may be in communication with the injector 106 and sensor 104 and record the injection and physiological characteristic measurement as injection activity data. The mobile device 102 may send the injection activity data to one or more servers 108 via a network 130. In another example, the injector 106 and the sensor 104 may transmit data directly to the one or more servers 108 via the network 130.

The servers 108 may be configured to process the injection activity data and output the processed data to the patient 110, as well as other relevant parties, via one or more modules. The additional parties may include a healthcare provider 112, a caregiver 114, a payor 116 (e.g., an insurer), a (medical) device manufacturer 118, and a pharmaceutical company 120. The additional parties may interact with the modules via one or more respective computing devices 124, such as a mobile phone, tablet, laptop, and/or desktop.

As noted, the injector 106 may be configured to administer an injection of medication to the patient 110. The injector 106 may comprise an auto-injector or wearable injector, which may be spring-loaded, motor-actuated, or actuated by other means. Injection with the injector 106 may be initiated by the patient 110 or caregiver 114. For example, the patient 110 or caregiver 114 may activate a button or the like on the injector 106. In other injector 106 configurations, injection may be initiated by pressing the injector 106 against the target site of the patient's 110 body. As another example, the injection may be initiated via remote means, such as via an input to the mobile device 102 connected to the injector 106. The injector 106 may be attached to the patient 110. For example, the injector 106 may be configured with adhesive and stuck to the patient's 110 skin. In other instances, the injector 106 may be un-affixed to the patient's 110 body. For example, the injector 106 may be hand-held.

The sensor 104 may be used to take one or more measurements of a physiological characteristic of the patient 110 in association with the injector 106 administering the medication. For example, a physiological measurement may be taken just prior to, during, just after the injection, or any combination thereof. A physiological measurement may be taken at multiple points in the injection procedure. For instance, a measurement may be taken just prior to the injection and again just after the injection. A measurement may also be taken during the injection in the aforementioned example. The one or more measurements may comprise a time series of the physiological characteristic. The patient 110 or caregiver 114 may initiate capturing the measurement before the injection is performed, such as via input to the mobile device 102. The patient 110 or caregiver 114 may afterwards stop capturing the measurement, such as via another input to the mobile device 102.

Whether taken only once or multiple times (e.g., as a time series) during the injection procedure, such physiological measurements may enable insight into how the injection affects the patient 110 with respect to the measured physiological characteristic. Multiple measurements in particular may allow even further understanding since a differential analysis on the measurements may be performed.

Physiological characteristics measured by the sensor 104 may include, for example, heart rate (e.g., pulse), blood pressure, oxygen saturation, blood sugar, body temperature, respiratory rate, and/or heart rate variability. The sensor 104 may also capture (as additional physiological characteristics) a step count, a patient fall, a body posture, a body weight, activity level, and/or electrocardiogram (ECG or EKG) data. As such, the sensor 104 may comprise a heart rate monitor, a blood pressure monitor, a pulse oximeter, a glucose meter, an inertial measurement unit (IMU), a pedometer, an ECG lead and processor, a respiratory monitor, or a temperature sensor (e.g., thermometer). Additionally, multiple sensors 104 of similar or varying types may be used concurrently by a patient 110.

Additionally or alternatively, analysis may be performed on one or more communications between the patient 110 and an associated healthcare provider 112 or caregiver 114 to determine a physiological characteristic measurement of the patient 110. For example, the audio of a call (e.g., an audio-only call or an audio/video call) between the patient 110 and a healthcare provider 112 or caregiver 114 may be analyzed to qualitatively determine if the patient 110 is sick or not. This may include identifying any coughing or sneezing in the call audio and determining a frequency of the coughing or sneezing. As another example, the video of a video call between the patient 110 and a healthcare provider 112 or caregiver 114 may be analyzed via gesture recognition to identify various gestures (and/or frequencies thereof) indicative of one or more physical characteristics of the patient 110. For example, gesture recognition may be used to determine the patient's 110 body posture or range of motion. In addition, the video of a video call between the patient 110 and a healthcare provider 112 or caregiver 114 may be analyzed with respect to the physical appearance of the patient 110 in the video. For example, the call video may be analyzed to determine that the patient 110 is jaundiced. The above-noted cough frequency, sneeze frequency, body posture, range of motion, or jaundice may each comprise a physiological characteristic of the patient 110.

In an embodiment, the sensor 104 may be attached to the patient's 110 body. For example, the sensor 104 may be configured with an adhesive to adhere the sensor 104 to the patient's 110 body. As another example, the sensor 104 may be partially or fully implanted within the patient's 110 body. In another embodiment, the sensor 104 may be integrated with the injector 104. For example, the injector 106 may be configured to adhere to the patient's 110 body and the integrated sensor 104 may use this contact with the patient's 110 body to take the physiological measurement. In the case of a non-attached injector 106, the sensor 104 portion of the injector 106 may be applied to the appropriate part of the patient's 110 body to take the measurement. In another embodiment, the sensor 104 may be worn by the patient 110. For example, the sensor 104 may be realized via a wearable electronic device, such as a smartwatch or a fitness tracker comprising the sensor 104.

The mobile device 102 may be configured to communicate with the sensor 104 and the injector 106. Such communication may enable the mobile device 102 to control certain functions of the sensor 104 or injector 106 and/or receive data from the sensor 104 or injector 106. The mobile device 102 may communicate wirelessly with the sensor 104 or injector 106. For example, the mobile device 102 may communicate with the sensor 104 or injector 106 via Bluetooth or other personal area network (PAN) technology. Additionally or alternatively, the mobile device 102 may communicate with the sensor 104 or injector 106 via a wired connection. As such, the sensor 104 and the injector 106 may be configured with a wireless network interface and/or a wired network interface.

The mobile device 102, sensor 104, and injector 106 may communicate and interact with one another according to one or more configurations or combinations thereof. In an example embodiment, the mobile device 102 may wirelessly communicate with each of the sensor 104 and the injector 106 and generally direct the functions and data flow associated with one or more injections. In another example embodiment, the sensor 104 and the injector 106 may connect to and communicate with one another, yet the mobile device 102 and the sensor 104 remain unconnected. For example, the sensor 104 may transmit physiological measurements to the injector 106 and the injector 106 may transmit the measurements to the mobile device 102. Similarly, the injector 106 may receive and relay control messages from the mobile device 102 to the sensor 104.

The mobile device 102 may be configured to recognize and connect with the sensor 104 or the injector 106 automatically (or vice versa). Additionally or alternatively, the patient 110 or caregiver 114 may initiate the connection of the mobile device 102 to the sensor 104 or the injector 106. For example, the patient 110 or caregiver 114 may provide an input to the mobile device 102 to cause the mobile device 102 to wirelessly scan for the sensor 104 or injector 106 within its vicinity and thereafter connect. The patient 110 or caregiver 114 may be given the option, via the mobile device 102, to connect to the sensor 104 or injector 106 or decline to connect. The mobile device 102 may recognize and connect to the sensor 104 or injector 106 via scanning a scannable indicia (e.g., a label or barcode) indicated on the sensor 104 or injector 106, respectively. The mobile device 102 may recognize and connect to the sensor 104 or injector 106 via near-field communication (NFC) with the sensor 104 or injector 106, respectively. A user may additionally or alternatively enter an identifier (e.g., a credential) into the mobile device 102 that was indicated on the sensor 104 or injector 106 to cause the mobile device 102 to recognize and connect to the sensor 104 or injector 106, respectively. The scannable indicia or identifier may be additionally or alternatively provided independent of the sensor 104 or injector 106. Such measures may prevent unauthorized control of the injector 106, as well as unauthorized access to measurements taken by the sensor 104 and any injection activity of the injector 106.

The sensor 104 may additionally or alternatively measure and record a physiological characteristic of the patient 110 on an on-going basis, besides during the injection procedure. For example, a historical record of the physiological measurements may be based on the on-going measurements. The historical record may be maintained at the injector 106, the mobile device 102, and/or the servers 108. The historical record, as well as contemporaneous measurements, may be used to generate a notification on the mobile device 102 regarding a scheduled or an already-initiated injection. Generating the notification may be further based on drug-related factors provided by a pharmaceutical company 120. The notification may comprise an instruction or recommendation for the patient 110 to proceed with an injection or an instruction or recommendation for the patient 110 to not proceed with an injection. The notification may indicate an alternative time for the patient 110 to perform the injection or a delay time before performing the injection. The mobile device 102 or injector 106 may additionally or alternatively block the injection altogether for a certain time.

In an example use of the historical record of physiological measurements, a medication administered by the injector 106 may be associated with a drop in blood pressure and heavy exercise is not recommended within a two-hour window before and after an injection. The patient 110 may have an injection scheduled for Friday evening but misses this injection. The historical data may reflect a typical period of heavy exercise by the patient on Saturday mornings. If the patient begins to initiate the missed injection on Saturday morning, the mobile device 102 may determine, based on the historical record, that the patient 110 should delay the injection and generate a notification on the mobile device 102 accordingly. The notification may indicate associated risks of receiving the injection just before or after heavy exercise.

The injector 106 may be configured to determine performance data indicating one or more performance measurements for the injector 106. As such, the injector 106 may be configured with one or more sensors to capture said performance measurements. For example, the injector 106 may be configured with a battery sensor that measures a remaining charge of the injector's 106 battery. Other sensors of the injector 106 may perform as triggers to determine a state of various aspects of the injector 106. For example, a sensor may be used to detect that the injector 106 was tampered with. Such a sensor may detect that the casing of the injector 106 was opened, for instance. The performance data indicating a performance measurement and/or a state of the injector 106 may be transmitted to the server 108. A device manufacturer 118 may use the performance data from the injector 106, as well as performance data from numerous other injectors of the same or similar type, to analyze the performance and reliability of the injector type. A device manufacturer 118 may additionally or alternatively use the performance data from the numerous injectors in virtually simulating the drug delivery experience, such as for quality control or in root cause analysis of a failure state.

The performance data may also be applied to the patient's 110 experience with the injector 106. For example, the patient 110 may begin to initiate an injection procedure and the mobile device 102 may generate, based on battery performance data, a notification indicating that the battery is low and recommending that the injection not commence since the low battery may cause the injection to fail. As another example, the mobile device 102 may generate, based on performance data relating to integrity of the injector's 106 casing, a notification indicating that the injector 106 may have been subject to tampering and recommending that the injector 106 be discarded. The notification in either example may be shown on a display screen of the mobile device 102.

In an example operation, the patient 110 may activate the injector 106 to cause it to administer an injection. The injector 106 may transmit a message to the mobile device 102 indicating that the injection was administered. This may be at the same time as the injection, assuming that the mobile device 102 and the injector 106 are already connected. Or the injector 106 may transmit the message to the mobile device 102 some while after performing the injection. This may be the case if the mobile device 102 is not connected to the injector 106 at the time of the injection. The injector 106 may hold the message until the mobile device 102 next connects. The mobile device 102 may record the time that the injection was administered, which may have been indicated in the message from the injector 106.

The sensor 104 may transmit to the mobile device 102 a message indicating one or more physiological measurements associated with the injection. The message may be responsive to an instruction from the mobile device 102 for the sensor 104 to begin capturing the measurement and/or for the sensor 104 to transmit the measurement to the mobile device 102. As with the message from the injector 106 indicating the injection, the physiological measurements may be transmitted at the time of the injection or at a later time. The physiological measurements may be timestamped. The mobile device 102 may transmit the indication that the injection was administered, the time that it was administered, the physiological measurement, and the times of the physiological measurements to the servers 108 as injection activity data.

The servers 108 may be configured to receive the injection activity data and implement systems and methods for medical device usage management based, at least in part, on the injection activity data. The servers 108 may comprise one or more modules configured to process the injection activity data and present information derived from, to varying degrees, the injection activity data. The servers 108 may comprise a module for each of a plurality of pre-defined profiles (e.g., "personas"). The profiles may correspond with a patient 110, a healthcare provider 112, a caregiver 114, a payor 116, a device manufacturer 118, and a pharmaceutical company 120, respectively. The example shown here includes the aforementioned six example profiles, although the invention is not so limited. In addition to processing and presenting injection activity data according to an associated profile, the modules also enable communication and data exchange between the various parties. For example, the modules may enable a patient 110 to send to and receive messages from a caregiver 114 or healthcare provider 112 via a text-based medium, such as email, text messaging, or in-system (e.g., via the servers 108 and/or modules) messaging. As another example, the modules may enable a patient 110 to initiate or receive a call with a caregiver 114 or healthcare provider 112. Such a call may be audio only or may be an audio/video call.

It is contemplated that a profile may include multiple members. For example, the servers 108 may receive injection activity data from multiple patients 110, which may be processed and shared according to the relevant healthcare provider 112, caregiver 114, or other profile. As another example, numerous patients 110 may use a particular device manufacturer's 118 injector. This device manufacturer 118 may receive injection activity data from each of those patients 110 using this injector. Likewise, a caregiver 114 may work with multiple patients 110 and thus receive data relating to those patients 110.

The modules of the servers 108 may be each associated with a particular profile. A module may comprise a back-end for communicating with other modules and processing injection activity data received by the servers 108, as well as other data received or stored by the servers 108. A module may comprise a front-end for interactions with the members of the associated profile. The front-end may comprise an application. An application may provide a user interface. An application may execute on one of the various computing devices 124 used by a party (including the mobile device 102), such as a mobile device app or a desktop computer application. An application may comprise a web site hosted by the servers 108 and presented to a party via a local web browser. A common web site may be used for multiple profiles, with the web site providing different functionality depending on the profile of a logged-in user.

A patient module realized by the servers 108 may enable a patient 110 or caregiver 114 to interact with an injector 106 and sensor 104, such as via an application executing on a mobile device 102. The patient module (e.g., via the application on the mobile device 102) may track the injections performed by an injector 106 and associated physiological measurements. The patient module may display a record of a patient's 110 injections and upcoming injection reminders. An auditory reminder may also be provided. The patient module may display whether a scheduled injection was performed or missed. The patient module may enable patients 110 to establish "connections" with one another to facilitate communication. A patient 110 may also exchange messages with a healthcare provider 112, caregiver 114, or other type of party. A patient 110 may give consent, via the module, for his or her injection activity data to be shared with other parties, such as a payor 116, a device manufacturer 118, or pharmaceutical company 120. The consent may be for the patient's 110 injection activity data to be shared in a manner in which the patient 110 may be personally identified. The consent may be for the patient's 110 injection activity data to be shared anonymously.

A healthcare provider 112 may comprise a physician, a physician assistant (PA), a nurse practitioner, or the like. A healthcare provider 112 may oversee aspects of the patient's 110 medical care, particularly with respect to the patient's 110 use of the injector 106. A healthcare provider 112 may have prescribed the medication delivered by the injector 106, although not necessarily so. A module of the servers 108 associated with a healthcare provider 112 (a healthcare provider module) may allow the healthcare provider 112 to monitor the patient's 110 usage of the injector 106 and the patient's 110 adherence to a prescribed dosage frequency or schedule. The healthcare provider module may also present aggregated injection activity data for numerous patients 110 of the healthcare provider 112. The healthcare provider module may enable communications between a healthcare provider 112 and his or her patients 110, such as to receive and answer patient questions. The healthcare provider module may also enable a healthcare provider 112 to establish "connections" with other healthcare providers 112, thereby facilitating interconnected networks of healthcare providers 112. Healthcare providers 112 may communicate with one another via the healthcare provider module.

A caregiver 114 may comprise a nurse, a nursing assistant or tech, or the like that cares for a patient 110. A caregiver 114 may be a professional caregiver. A caregiver 114 may additionally or alternatively include a friend, family member, or other type of unpaid caregiver. A caregiver 114 may be associated with multiple patients 110, such as in a hospital, rehab center, or a long-term care facility. The caregiver module may track injection activity for the associated patients 110 (or a single patient 110 if that is the case). The caregiver module may display a record of the injections administered to the associated patient(s) 110, including whether a scheduled injection was administered or missed. The caregiver module may display a schedule of the patient injections overseen by the caregiver 114. The caregiver module may provide visual or auditory reminders of an upcoming scheduled injection. The caregiver module may present a patient's 110 personal information and medical history/record. The caregiver module may enable communications between a caregiver 114 and associated patients 110, A payor 116 may comprise an insurer or other type of medical benefits provider associated with a patient 110. The payor 116 may be obligated to pay, at least in part, for the injector 106, the sensor 104, a medication administered via the injector 106, or other related medical expenses. A payor module realized by the servers 108 may provide data associated with injector activity, particularly injector activity that a payor 116 is responsible for paying, at least in some aspect or part. The data provided by the payor module may include anonymous data (e.g., includes no protected health information or other personally-identifiable health information) or may include personally-identifiable data. The payor module may receive a patient's 110 consent for their personal health information to be shared with a payor 116. The payor module may present data organized by pharmaceutical company, medication, patient, or any combination thereof, with associated statistics presented for each category. The payor module may provide usage statistics for the associated injector activity. The payor module may present data relating to injection schedule adherence for a payor's 116 associated patients 110.

A device manufacturer 118 may include a company or other party that develops injectors 106, manufactures injectors 106, or wholesale supplies injectors 106, or more generally has a direct financial interest in injectors 106. A device manufacturer module realized by the servers 108 may provide data associated with injector activity performed by a device manufacturer's 118 injector 106. The data may be anonymous data or may include personally-identifiable data. The device manufacturer module may receive a patient's 110 consent for their personal health information to be shared with a device manufacturer 118. The device manufacturer module may provide usage statistics for injections performed by a device manufacturer's 118 injector 106, such as cumulative usage over defined periods of time or in defined geographic regions. The device manufacturer module may receive and track patient complaints relating to a device manufacturer's 118 injector 106. The device manufacturer module may provide real-time data of its injector 106 usage. The device manufacturer module may provide machine learning and AI-based analysis of injection activity data.

A pharmaceutical company 120 may include a pharmaceutical development company of an injected medication, a pharmaceutical company of an injected medication, or more generally a party with a direct financial interest in an injected medication. A pharmaceutical company module of the servers 108 may provide data relating to a pharmaceutical company's injected medication(s). The data may be anonymous data or may include personally-identifiable data. The pharmaceutical company module may receive a patient's 110 consent for their personal health information to be shared with a pharmaceutical company 120. The pharmaceutical company module may provide a notice of such consent. The pharmaceutical company module may provide usage statistics for injections of a medication of a pharmaceutical company 120. Such usage statistics for each medication may be organized by each type of medication administration method with which it is offered. For example, a first set of usage statistics may be provided for the administration of a medication via a first delivery method, and a second set of usage statistics may be provided for the administration of the medication via a second delivery method. Examples of delivery methods include syringes, needle safety systems, autoinjectors, patch (wearable) injectors, infusion pumps, etc. The pharmaceutical company module may receive and track patient complaints relating to a pharmaceutical company's medication. The pharmaceutical company module may provide real-time data of its medication usage. The pharmaceutical company module may provide machine learning and AI-based analysis of injection activity data. The pharmaceutical module company may identify one or more injectors 106 as part of a clinical trial and collect adherence data relating to the identified injectors 106.

The one or more servers 108 may comprise a plurality of networked servers and/or other computing devices. The servers 108 may comprise various network devices or elements, such as switches, routers, and the like. The servers 108 may comprise a database or other storage system, such as to store injection activity data and data associated with patients 110, healthcare providers 112, caregivers 114, payors 116, device manufacturers 118, and pharmaceutical companies 120.

The network 130 may comprise any combination of wired (e.g., Ethernet) and/or wireless networks (e.g., cellular, Wi-Fi). The network 130 may comprise any combination of private and/or public networks (e.g., the Internet).

A computing device 124 may refer generally to any computing device used by a party to access the servers 108 or one of more of the modules provided by the servers 108. A computing device 124 may comprise, for example, a desktop computer or a mobile device. A computing device 124 may comprise a display configured to display a user interface provided by a module of the servers 108. A computing device 124 may execute an application or web browser to display a module's user interface.

Figure 2:
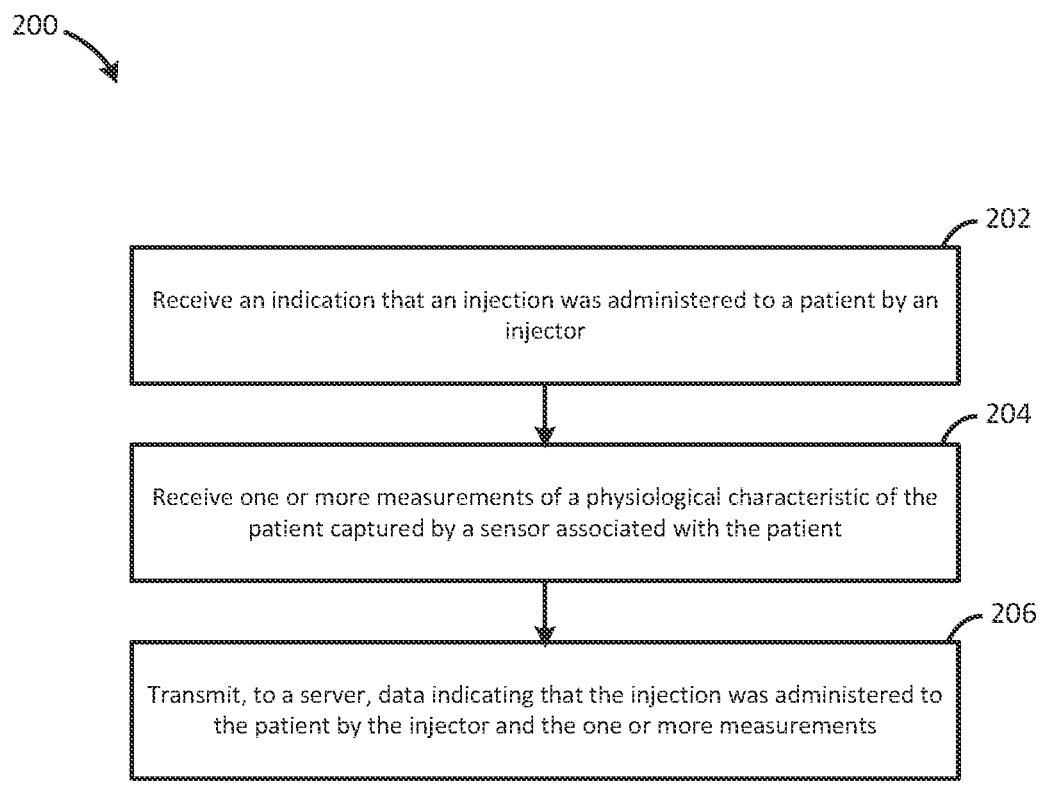
FIG. 2 illustrates an example method flow diagram according to an embodiment of the present disclosure.

FIG. 2 illustrates an example method 200 relating to administering an injection to a patient. At step 202, an indication that the injection was administered by the injector (e.g., the injector 106 of FIG. 1) to the patient (e.g., the patient 110) is received by a mobile device (e.g., the mobile device 102). Such indication may be received from the injector. Such indication may be received wirelessly, such as via Bluetooth or other near-field technology.

The injector may comprise an auto-injector or a wearable injector. The injector may be adhered to the patient's body. The injector may be configured with a button or the like for the patient to initiate the injection. Additionally or alternatively, the injection may be initiated based on a signal from the mobile device. The patient or other person may provide an input to a user interface of the mobile device to initiate the injection.

The indication that the injection was administered may comprise a timestamp or the like for the injection. Additionally or alternatively, the mobile device may determine the time that the injection was administered, such as based on the time that the indication was received by the mobile device.

In some examples, the mobile device must establish a wireless connection to the injector and/or sensor to receive the indication that the injection was administered and/or the one or more measurements, respectively. The patient or other person may provide one or more user inputs to the user interface of the mobile device to cause the mobile device to connect to the injector and/or the sensor. Before connecting to the injector and/or sensor, the patient or other person may provide one or more user inputs to the user interface of the mobile device to cause the mobile device to perform a wireless scan to detect the injector and/or sensor.

In some examples, the mobile device may connect to the injector and/or sensor based on respective identifiers received or determined by the mobile device. An identifier may be input by the patient or other person to the user interface. For example, the patient or other person may read an identifier off of the injector and/or sensor (or other associated papers, packaging, etc.). Additionally or alternatively, an identifier may be determined by scanning a scannable indicia on the injector and/or sensor (or other associated papers, packaging, etc.) with the mobile device.

At step 204, the mobile device receives one or more measurements of a physiological characteristic of the patient. The one or more measurements may be captured by a sensor associated with the patient. In an example, the sensor may be adhered to the patient. In an example, the sensor may be implanted, at least in part, within the patient's body. In an example, the sensor may be a wearable sensor. The physiological characteristic of the patient may include heart rate, pulse, blood pressure, oxygen saturation, blood sugar, body temperature, respiratory rate, heart rate variability, step count, a detected patient fall, body posture, body weight, activity level, electrocardiogram data, cough frequency, sneeze frequency, body posture, range of motion, or jaundice.

The one or more measurements of the physiological characteristic may comprise a measurement taken before the injection. The one or more measurements may additionally or alternatively comprise a measurement taken after the injection. The one or more measurements may additionally or alternatively comprise a measurement during the injection. The one or more measurements may comprise a time series of the one or more measurements.

In some examples, the patient or other person may provide a user input to the user interface of the mobile device to cause the mobile device to receive the one or more measurements. This may be done before the injection. This may include sending an instruction or request for the sensor to start capturing the one or more measurements and/or to send the one or more measurements to the mobile device. The patient or other person may additionally or alternatively provide a user input to the user interface of the mobile device to cause the mobile device to stop receiving the one or more measurements. This may be done after the injection. This may include sending an instruction or request for the sensor to stop capturing the measurements and/or for the sensor to stop sending the measurements to the mobile device.

At step 206, the mobile device transmits data (e.g., injector activity data). The data may be transmitted to a server (e.g., the servers 108 of FIG. 1). The data may indicate that the injection was administered to the patient by the injector. The data may further indicate the one or more measurements of the physiological characteristic of the patient. The data may indicate the time that the injection was administered.

The data may additionally or alternatively indicate any times associated with the one or more measurements. For example, the data may indicate when a measurement was captured. The data may indicate when a first measurement before the injection was captured and when a second measurement after the injection was captured. The data may indicate a time range between when an initial measurement was captured and when a final measurement was captured. The data may indicate a time range for a time series of measurements.

One or more modules of the servers (e.g., a patient module, a healthcare provider module, a caregiver module, a payor module, a device manufacturer module, or a pharmaceutical company module) may process the data according to their various functions. Data presented on a user interface associated with a module of the servers may be based, at least in part, on the data received from the mobile device. For example, an injection adherence display of the patient module may reflect the instant injection. As another example, the data received from the mobile device may be anonymized and included in usage statistics determined by the payor, device manufacturer, and/or pharmaceutical company modules. As another example, the healthcare provider module may notify the associated healthcare provider that the injection was administered.

Example user interfaces associated with the patient profile, healthcare provider profile, caregiver profile, payor profile, device manufacturer profile, and pharmaceutical company profile shall now be described in relation to FIGS. 3A-H, 4A-C, 5A-B, 6A-D, 7A-E, and 8A-C. The user interface of FIGS. 3A-H is shown in an aspect ratio generally associated with smart phones (e.g., the mobile device 102 of FIG. 1), although the disclosure is not so-limited. The user interfaces of FIGS. 4A-C, 5A-B, 6A-D, 7A-E, and 8A-C are shown in an aspect ratio similar to that often associated with a tablet display or desktop computer display. The user interfaces of FIGS. 3A-H, 4A-C, 5A-B, 6A-D, 7A-E, and 8A-C are not so-limited and may be similarly configured in any aspect ratio.

FIGS. 3A-H illustrate an example user interface 300 associated with the patient profile. The user interface 300 comprises a main interface area 304 in which various displays and user interactions may be implemented. For example, the main interface area 304 shown in FIG. 3A comprises an injection history display 306. The injection history display 306 comprises a plurality of entries each corresponding to a scheduled injection. Each entry indicates the drug to be administered and the date and time of the scheduled injection. Each entry also indicates the status of the injection, including Missed, On Time, or Failed. Although not shown in FIG. 3A, each entry may also indicate the device (e.g., injector) that was used (or was supposed to have been used) to administer the scheduled injection. Each entry comprises an information element 308 that may be activated via user input to open a display with various details on the particular injection. The main interface area 304 may further include a circle graph 307 that represents the adherence rates for the respective drugs. This may provide the patient with an easy feedback mechanism to assess his or her adherence to the injection schedules. Although not shown in the figure, other graphs may be provided in the user interface that show the numbers of missed, on time, and failed injections.

The user interface 300 includes a bottom menu area 310 comprising a Home element 312, a Caregiver element 314, a Device element 316, a Community element 318, and an Insights element 320. Each element may be activated via user input to perform associated functions or displays.

Activation of the Home element 312 may bring the main interface area 304 to a default configuration. For example, the default configuration may comprise the injection history display 306.

Activation of the Caregiver element 314 may facilitate functions and user interface displays associated with the patient's caregivers. The "caregivers" referred to by the Caregiver element 314 may include both caregivers 114 and healthcare providers 112 described in relation to FIG. 1. Activation of the Caregiver element 314 may open one or more displays in the main interface area 304 in which a user may view one or more healthcare providers and one or more caregivers associated with the patient and their respective information. Interface elements may be provided that allow a message to be sent to a selected healthcare provider or caregiver. Interface elements may be provided that allow a user to consent to injection activity data being shared with a selected healthcare provider or caregiver. Interface elements may be provided for a user to submit feedback and/or a rating of a selected healthcare provider or caregiver. Interface elements may be provided that allow a user to add a new healthcare provider or caregiver, including establishing a connection within the system with the healthcare provider or caregiver.

Activation of the Devices element 316 may facilitate displays and functions associated with a patient's injector and/or sensors ("device(s)"). A display may list the patient's devices, including the brand, model, and unique identifier. The display may indicate a connection status between the mobile device and the device. In these displays, a user may select a device to open another display in which the user may view and edit information and configuration settings for the selected device. An interface element may be provided, such as in the list of devices, for the user to cause the mobile device to connect to a selected device. An interface element may be provided for the user to cause the mobile device to perform a wireless scan for any nearby Bluetooth-equipped (or the like) devices and display a list of any detected devices. An interface element may be provided in the list of detected devices to cause the mobile device to connect to a selected device. An interface element may be provided to cause the mobile device to scan a scannable indicia associated with a device. An interface element may be provided to cause the mobile device to perform a near-field communication (NFC) scan of a device. Such a scan of the scannable indicia or the NFC scan may determine an identifier that may be used to connect to the device.

In a display for a selected injector, an interface element may be provided for a user to receive operating instructions and other information of the injector. For example, the interface element may cause a manufacturer web page for the injector to be opened. In the display for a selected injector, an interface element may be provided for an injection procedure of the injector to proceed. A display may be provided comprising an interface element for the patient to give or deny consent for the injector activity data for this procedure to be shared with various identified parties or types of party. A display may be provided comprising an interface element for the user to start the injection procedure. The display may show one or more measurements of one or more physiological characteristics of the patient. The one or more measurements may update in real-time. Once the injection procedure is started, the display may show visual and numerical status indicators for the injection. When the injection procedure concludes, a display may be provided indicating the final status of the procedure (e.g., success or failed). A display may be further provided comprising an interface element for the user to give a feedback rating or comments for the injection procedure.

Activation of the Community element 318 may facilitate displays and functions relating to other patients associated with the instant patient. A display may be provided with a listing of "connections" to other patients, as well as pending outgoing connection requests from the patient and pending incoming connection requests from other patients or users. An interface element may be provided for the patient or user to send a message to another patient or user (e.g., a connected patient or user). A display may be provided that allows the patient or user to provide feedback on various aspects of injector usage, including feedback on an injector, the injected medication, the patient module or user interface 300 itself, or other topics.

Activation of the Insights element 320 may facilitate displays and functions relating to the experiences of other patients that use an injector or take a medication in common with the patient. A display may be provided that shows feedback statistics for feedback submitted by other patients (including the instant patient) for the injector or medication. A display may be provided that shows usage statistics for the injector or medication, such as the total number or percentage of patients in the system that use a particular injector model. A display may be provided that shows comparative usage statistics for two or more models of injectors.

The user interface 300 comprises a side menu 330 having a Profile element 332, a Feedback element 334, an Inventory element 336, a Medications element 338, and a Sensors element 340. Each element may be activated via user input to facilitate associated functions or displays. The side menu 330 may be selectively displayed based on user input, but may remain hidden otherwise. For example, a user may perform a horizontal swipe input at the left portion of the user interface 300 to cause the side menu 330 to appear.

Activation of the Profile element 332 may facilitate displays and functions relating to the patient's personal information and other attributes. The patient's personal information and other attributes may include an address, gender, date of birth, age, etc. A display may be provided that allows the patient to edit the patient's personal information and other attributes.

Activation of the Feedback element 334 may facilitate displays and functions relating to feedback from the user. A display may be provided for the user to select the type of feedback to submit, such as feedback for the patient's physicians or caregivers, an injector used by the patient, or a medication taken by the patient. A display may be provided for the patient to enter the feedback, such as written feedback or selection of a rating.

Activation of the Inventory element 336 may facilitate displays and functions relating to an available inventory or supply of the patient's prescribed medications or other consumable/disposable items. For example, a display may be provided that lists the quantity of medication doses held by the patient, such as the quantity of medication doses remaining within an injector. A display may be provided that allows the patient or other user to adjust the inventory of a medication or other item. The inventory may be automatically adjusted as injections are performed via the mobile device.

Activation of the Medications element 338 may facilitate displays and functions relating to the patient's medications. A display may be provided that lists the patient's medications. A display may be provided that shows detailed information about a medication selected from the list. For example, the detailed information may include a brand name, active chemical ingredients, a dosage, or a prescribing physician.

Activation of the Sensors element 340 may facilitate displays and functions relating to sensors associated with the patient. A display may be provided comprising a list of the sensors. A user may select a sensor from the list to open a display comprising information on the sensor, such as its type and a unique identifier. The display for the selected sensor may show a current or most recent measurement from the sensor and/or a past history of measurements from the sensor. A display may be provided that shows current or most recent measurements for multiple sensors associated with the patient. A display may be provided that allows the user to add or remove a sensor. Said display may comprise an interface element to cause the mobile device to scan for nearby sensors. An interfere element may thereafter be provided for the user to add a detected sensor. An interface element may be provided for the user to cause the mobile device to connect to a sensor.

Figures 3E, 3F:
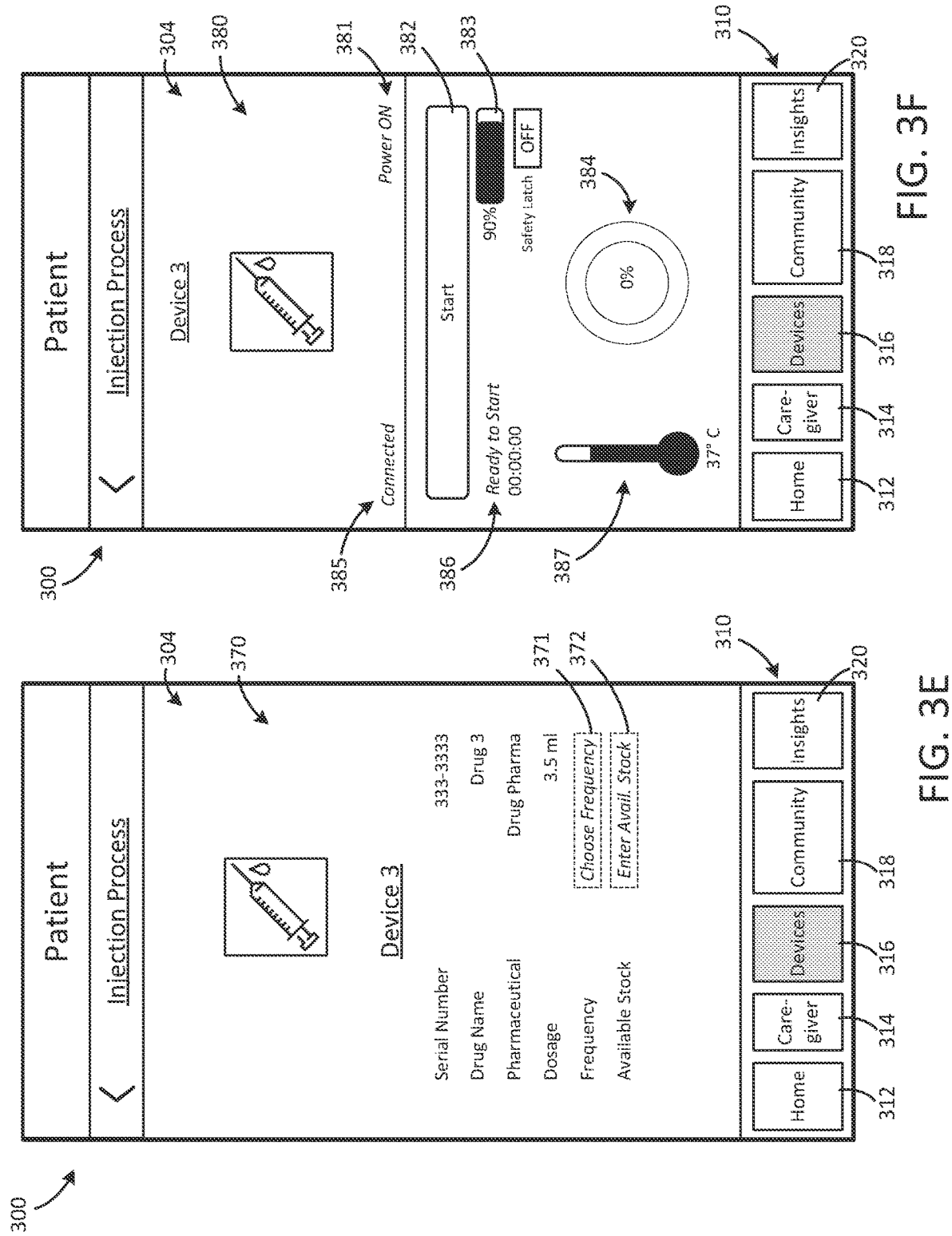

FIGS. 3C-H provide additional examples of the various functions and displays enabled by the patient user interface 300, some of which may have been already described, at least in part, above. FIGS. 3C and 3D relate in particular to a connection between the patient's mobile device and a device (e.g., an injector or sensor) and may be accessed via the Device element 316.

In FIG. 3C, the main interface area 304 comprises a device scan display 350 with elements 351*a-c*. The element 351*a* may be activated to cause the mobile device to perform a scan of a scannable indicia (e.g., a barcode or a QR code) associated with a device. Activation of the element 351*b* may cause the mobile device to perform a radio scan for any available wireless connections near the mobile device, particularly a wireless connection associated with a device. For example, the mobile device may perform a scan for any Bluetooth-enabled devices. Activation of the element 351*c* may cause the mobile device to scan a device configured with an NFC tag. Via any of these mechanisms, the mobile device may access information about the device, including its model, serial number, or a unique identifier of the particular device.

A device identified via the aforementioned methods may be reflected in the "My Devices" display 352. This display 352 comprises a listing of one or more devices already associated with the patient and/or mobile device, which may be active or inactive. An active device may refer to one that is connected to the mobile device and ready for use. Each entry of the listing identifies the name of the device, its serial number, whether it active or inactive, and a usage count of the device (e.g., the number of injections performed by the device).

FIG. 3D shows an "Available Devices" display 360 of the main interface area 304 that relates to available devices, such as those identified via the scanning methods enabled by the elements 351a-c in FIG. 3C. The display 360 comprises a listing 362 of one or more available devices. Each entry of the listing indicates the device and its serial number and includes a Training element 364 that may be activated to access training material. For example, activation of the Training element 364 may open a website that provides training material for the device or initiate a download of a training document (e.g., a PDF file). Selection of a device entry may enable further actions relating to the device, such as to cause the mobile device to connect to the device or add the device to the list of My Devices shown in the My Devices display 352 in FIG. 3C. The display 360 further includes a Stop Scan element 361 to cause the mobile device to discontinue any ongoing scan functions.

FIGS. 3E-H relate to an injection process. In FIG. 3E, the main interface area 304 comprises a device display 370 associated with a particular device (device 3 in this case). The device display 370 may be accessed by selection of the device in the My Devices display 352 shown in FIG. 3C. The device display 370 comprises an icon or image of the device and further indicates various information about the device, including a serial number of the device, the name of the drug administered by the device, a pharmaceutical company associated with the drug, a dosage, a frequency that the drug is to be administered, and an available stock of the drug (e.g., the number of doses remaining in the device). The frequency and the available stock may be input or modified by a user via the elements 371 and 372, respectively.

In FIG. 3F, the main interface area 304 comprises a device display 380 associated with a particular device (device 3 in this case). The device display 380 may be an extension of the device display 370 in FIG. 3E. The device display 380 may be accessed by selection of the device in the My Devices display 352 show in FIG. 3C. The upper portion of the device display 380 indicates the device name and its icon or image, as well as a connection status 385 of the device to the mobile phone and an ON/OFF power status 381 of the device. The lower portion of the device display 380 enables an injection to be performed. The lower portion comprises a "Start" status 386 (indicating "Ready to Start"), a power (e.g., battery) level 383 indicator, and an indication of whether a safety latch on the device is engaged or off. The lower portion further indicates a current physiological characteristic (i.e., a measurement thereof) of the patient (temperature in this case), via a graphical representation 387 of the physiological characteristic. The graphical representation 387 of the physiological characteristic, as well as the accompanying text ("37° C."), may allow the patient or caregiver to easily monitor this physiological characteristic before, during, and after the injection. A Start/Stop element 382 is provided which, when activated, causes the device to start an injection (as would be the case here) or stop an ongoing injection. A progression element 384 shows the progression or status of the ongoing injection. Here, the progression element 384 is in the form of a circular indicator that graphically (and textually) represents the percent completion of the injection. An elapsed time ("00:00:00") of the injection is provided below the Start status 386.

FIG. 3G further illustrates the device display 380 while an injection is in progress, such as via activation of the Start/Stop element 382. Here, the Start status 386 indicates that the injection has started, with an elapsed time of 2 seconds ("00:00:02"). The Start/Stop element 382 may be further activated to cause the injection to be stopped. The progression element 384 indicates that the injection is 25% complete. The graphical representation 387 of the physiological characteristic (and accompanying text) continued to indicate a current measurement of the physiological characteristic. In may be seen here that the patient's temperature dropped to 35° C. from the pre-injection temperature of 37° C. indicated in FIG. 3F.

FIG. 3H shows a post-injection summary of an injection, such as that represented in FIGS. 3F and 3G. In particular, the main interface area 304 comprises a summary display 388 that indicates the name of the device ("Device 3"), a picture or icon of the device, the drug name of the administered drug ("Drug 3"), the pharmaceutical company associated with the drug, the date and time of the injection ("Nov-19-19 19:07"), the status of the injection ("Success"), a date and time for a next injection ("Nov-19-19 19:07"), the dosage administered by the injection ("3.5 ml"), and the available stock ("0"). The summary display 388 also comprises a line chart 389 that indicates a measured physiological characteristic (body temperature in this example) over a period of time associated with the injection. Other types of charts, graphs, or other visual representations of the physiological characteristic may be additionally or alternatively used. It is also contemplated that more than one physiological characteristic may be monitored and represented in a manner analogous to the example body temperature shown in FIGS. 3F-H.

Figure 4A:
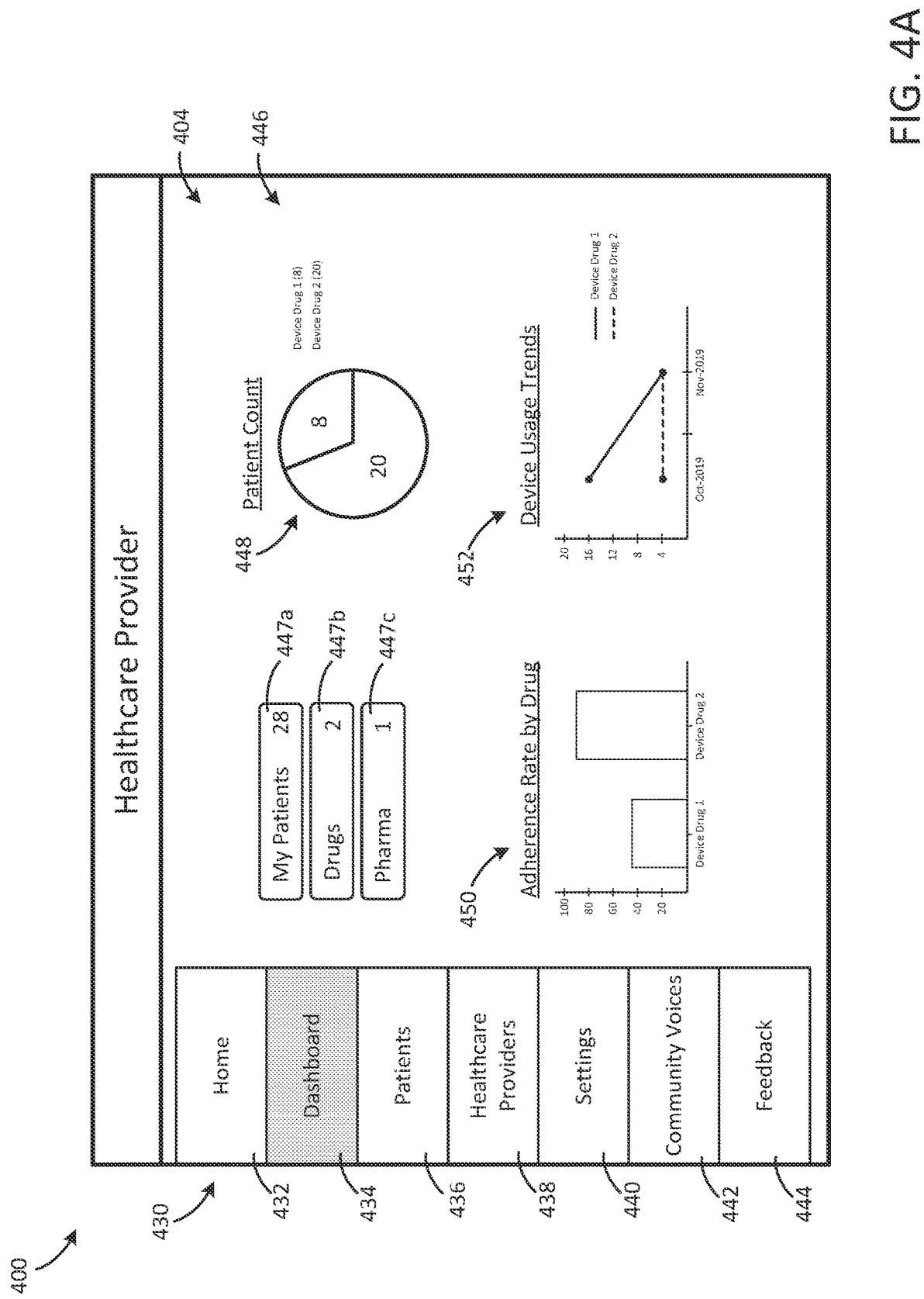
Figure 4B:
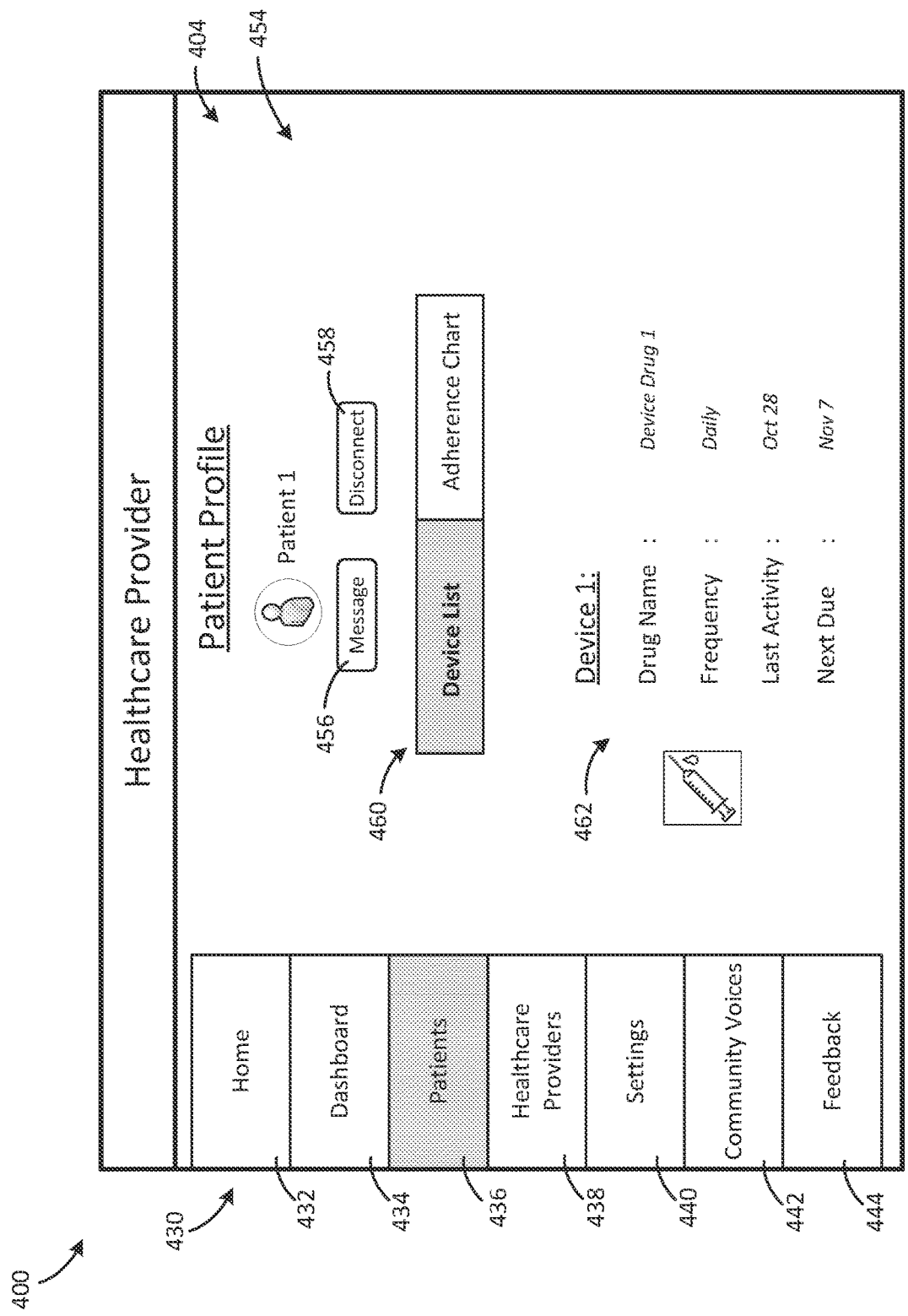
Figure 4C:
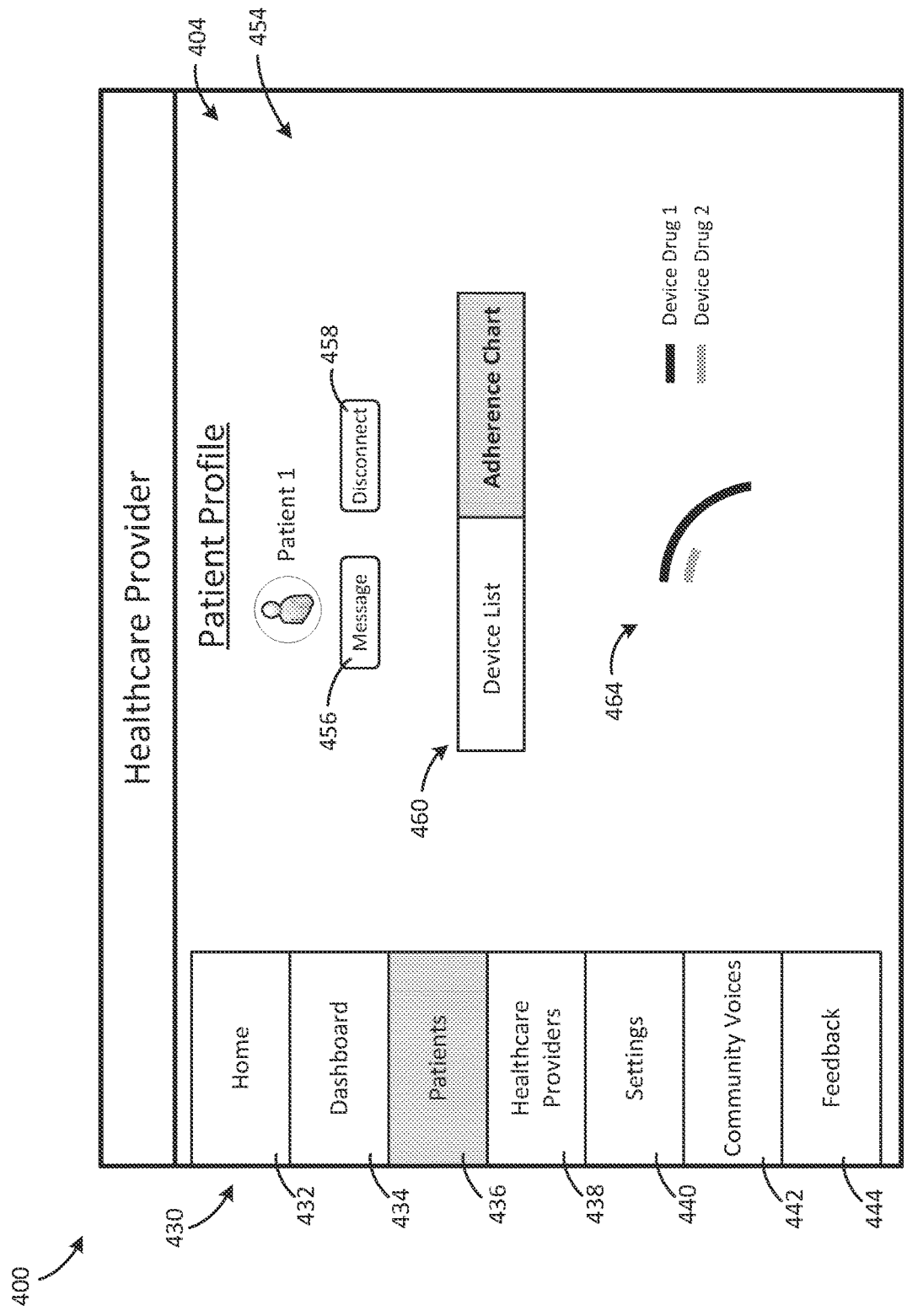

FIGS. 4A-C illustrate an example user interface 400 associated with the healthcare provider profile. The user interface 400 comprises a main interface area 404 in which various displays and user interactions may be implemented. The user interface 400 comprises a side menu 430 having a Home element 432, a Dashboard element 434, a Patients element 436, a Healthcare Providers element 438, a Settings element 440, a Community Voices element 442, and a Feedback element 444. Each element may be activated via user input to perform associated functions or displays. The side menu 430 may be selectively displayed based on user input or may generally remain visible.

Activation of the Home element 432 may bring the main interface area 404 to a default configuration. A user may select the elements shown in the default configuration via the Settings element 440, for example. The default configuration may show available features of the healthcare provider module and the user interface 400.

Activation of the Dashboard element 434 may cause a configurable display of various informational elements (e.g., modules) in the main interface area 404. A healthcare provider may select which information elements are to be shown in the dashboard display from a list of available informational elements. An example configuration of a dashboard display 446 is shown in the main interface area 404 in FIG. 4A. In this example, the dashboard display 446 comprises a My Patients element 447a to indicate the number of patients ("28") under the healthcare provider's care, a Drugs element 447b to indicate the number of drugs ("2") prescribed by the healthcare provider (e.g., drugs administered via injection), and a Pharma element 447c to indicate the number of pharmaceutical companies associated with these drugs ("1").

The dashboard display 446 further comprises a Patient Count element 448 that indicates the number of the healthcare providers associated with each of the drugs via a pie chart. The dashboard display 446 further comprises an Adherence Rate by Drug element 450 that indicates the adherence rates associated with the respective drugs via a bar graph. The dashboard display 446 further comprises a Device Usage Trends element 452 that indicates a trend over time in the number of devices (and/or administered drugs thereof) of each type that are prescribed for use by the healthcare provider. The information indicated in the respective elements 448, 450, 452 may be additionally or alternatively represented using other types of charts, graphs, or other visual representations besides those explicitly shown in FIG. 4A.

Activation of the Patients element 436 may facilitate displays and functions associated with a healthcare provider's patients. For example, an interface element may be provided for the healthcare provider to request connection with a patient. A display may be provided showing pending outgoing patient connection requests and pending incoming connection requests. As another example, a display may be provided comprising a list of said patients. A patient entry in the list may indicate an adherence rate for the patient. A patient entry may be activated to cause display of the patient's profile.

An example patient profile is shown in FIGS. 4B and 4C. In particular, the main interface area 404 comprises a patient profile display 454 that indicates the name of the patient ("Patient 1") along with a picture of the patient. A Message element 456 is provided that, when activated, allows a message to be sent to the patient, such as via in-system messaging, email, or text. Additionally or alternatively, activation of the Message element 456 may initiate a call to the patient. A Disconnect element 458 is provided that, when activated, allows the healthcare provider to remove the healthcare provider's connection with the patient within the system. A toggleable Device/Adherence element 460 is provided. When set to "Device List," as in FIG. 4B, one or more devices (just one in this example) associated with that patient are displayed. An example device entry 462 for "Device 1" indicates the name of the drug administered by the device, the injection frequency, a last activity date (e.g., a date of the last injection or attempt thereof), and a date that the next injection is due. When the Device/Adherence element 460 is toggled to "Adherence Chart," as shown in FIG. 4C, the patient profile display 454 displays a circular chart 464 that represents the adherence rate by the patient for each of the device drug 1 (administered by the device 1 in FIG. 4B) and a device drug 2 (administered by a device 2, not shown in FIG. 4B). The adherence rates may be additionally or alternatively indicated textually and/or using different types of charts, graphs, or other visual representations.

With renewed attention to FIG. 4A, activation of the Healthcare Providers element 438 may facilitate displays and functions associated with other healthcare providers. A display may be provided comprising a list of other healthcare providers that are connected with the instant healthcare provider. An interface element may be provided for a user to send a message to another healthcare provider. An interface element may be provided for the user to request connection with another healthcare provider. A display may be provided showing pending outgoing connection requests to other healthcare providers and pending incoming connection requests from other healthcare providers.

Activation of the Settings element 440 may facilitate displays and functions for the user to view and change various settings. The settings may define the elements (e.g., the elements 447*a-c*, 448, 450, and 452) shown in the dashboard display 446. The settings may additionally or alternatively define the visual appearance and contents of one or more of the displays resulting from activation of the elements of the side menu 430. The healthcare provider may enter or edit personal information via activation of the Settings element 440.

Activation of the Community Voices element 442 may facilitate displays and functions associated with a pool of patients, including the healthcare provider's patients and patients of other healthcare providers in the system. A display may be provided showing usage statistics for the pool of patients. The usage statistics may be organized according to device (e.g., injector), medication, pharmaceutical company, payor, and/or device manufacturer. The usage statistics may relate to adherence to an injection schedule. A display may be provided showing aggregated feedback data for the pool of patients. The feedback data may be organized according to injector, medication, pharmaceutical company, payor, and/or device manufacturer.

Activation of the Feedback element 444 may facilitate displays and function associated with feedback provided by patients of the instant healthcare provider. The feedback may relate to the healthcare provider, devices used by the patients, or the medications administered to the patients. The feedback may comprise written feedback and rating feedback.

Figure 5A:
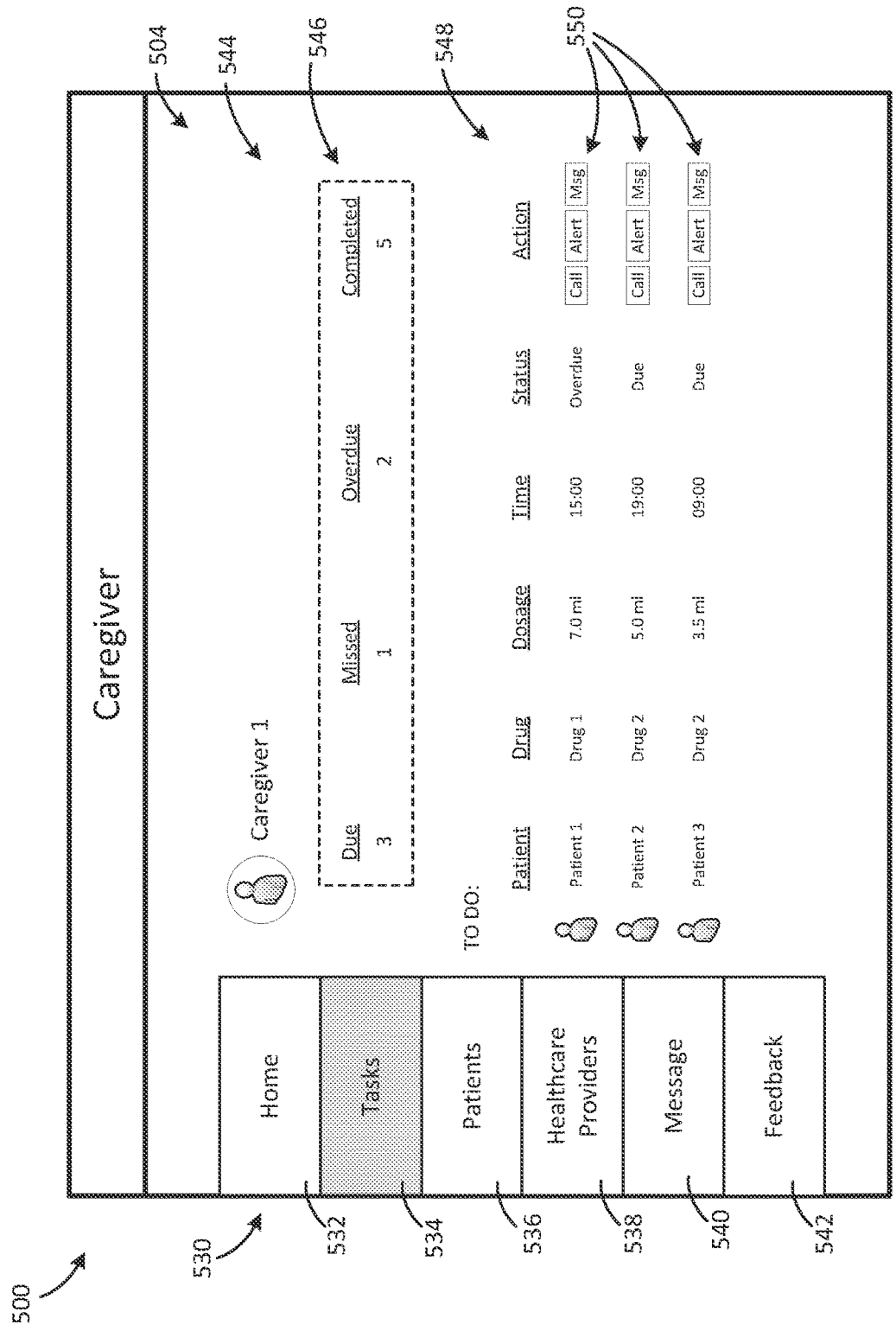

FIGS. 5A, B illustrate an example user interface 500 associated with the caregiver profile. The user interface 500 comprises a main interface area 504 in which various displays and user interactions may be implemented. The user interface 500 comprises a side menu 530 having a Home element 532, a Tasks element 534, a Patients element 536, a Healthcare Providers element 538, a Message element 540, and a Feedback element 542. Each element may be activated via user input to perform associated functions or displays. The side menu 530 may be selectively displayed based on user input or may generally remain visible.

Activation of the Home element 532 may bring the main interface area 504 to a default configuration. The default configuration may comprise various informational interface elements that provide an overview of a caregiver's activities or information relating to the caregiver's patients. The default configuration may indicate that a new message for the caregiver has been received. The default configuration may show available features of the caregiver module and user interface 500.

Activation of the Tasks element 534 may facilitate displays and functions associated with past, current, and scheduled tasks. An example tasks display 544 is shown in FIG. 5A for an instant caregiver, Caregiver 1. In this example tasks display 544, a summary element 546 is provided that provides a status overview of the injections overseen by the caregiver. For example, the summary element 546 indicates the number of injections that are due, the number that were missed, the number that are overdue, and the number that are completed. The tasks display 544 further comprises a "TO DO" listing 548 that lists, by patient, one or more past and/or present injections overseen by the caregiver. For each patient (i.e., row of the listing), the name of the drug, the dosage of the injection, the scheduled time for the injection, and the injection's current status (due, missed, overdue, or completed) are indicated. For each row, a trio of Call, Alert, and Msg (Message) elements 550 are provided. A Call element may be activated to initiate a telephone call (with or without video) to the patient. The Alert element may be activated to cause an alert or reminder to be sent to the patient. For example, a reminder text message may be sent to the patient. Additionally or alternatively, an in-system reminder may be sent to the patient, which may cause a pop-up notification to display on the patient's mobile device. The Msg element may be activated to send a personal message to the patient, such as via email, text, or in-system messaging.

Figure 5B:
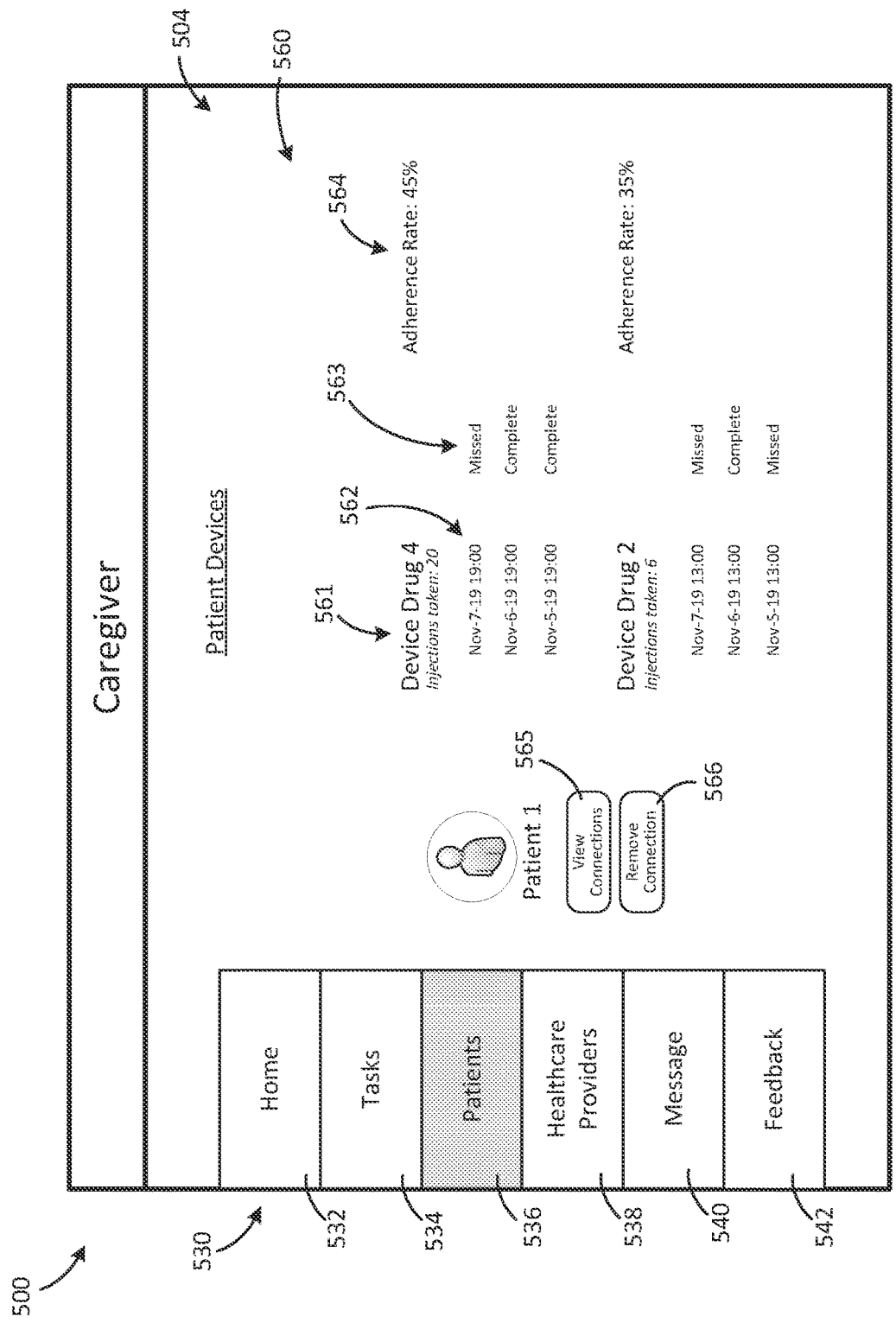

Activation of the Patients element 536 may facilitate displays and functions associated with the caregiver's patients. A display may be provided showing a list of the patients. Selection of a patient entry in the list may open a patient display 560 in the main interface area 504, as shown in FIG. 5B, indicating patient information and one or more devices (e.g., injectors) of the patient. In the patient display 560 in FIG. 5B, the patient is identified by name and picture and a View Connections element 565 and a Remove Connection element 566 are provided. The View Connections element 565 may be activated to view the patient's various connections to other patients, healthcare providers, caregivers, etc. The Remove Connections element 566 may be activated to remove the connection between the caregiver and the patient. A listing of the patient's device(s) (and/or associated drug) are provided. For each device entry, the name of device (and/or associated drug) 561, a number of injections taken with the device, and the patient's adherence rate 564 with respect to the device are provided. A sub-listing for individual injections is also given, with each sub-entry comprising a date/time 562 of the injection and its status 563 (e.g., missed, due, overdue, or complete).

With renewed attention to FIG. 5A, activation of the Healthcare Providers element 538 may facilitate displays and functions associated with connected healthcare providers. Connected healthcare providers may have patients in common with the caregiver. A display may be provided showing a list of healthcare providers. Selection of a healthcare provider entry in the list may open another display showing information on the healthcare provider and the healthcare provider's patients. The display may show a ratings for the healthcare provider. The display may comprise an interface element to send a message to the healthcare provider.

Activation of the Message element 540 may facilitate displays and functions associated with messages to or from various other parties, such as patients, healthcare providers, or other caregivers. A display may be provided showing one or more messages sent to the caregiver. The display may comprise an interface element for sending a message to a party.

Activation of the Feedback element 542 may facilitate displays and functions associated with feedback directed to the caregiver and/or feedback submitted by the caregiver. A display may be provided comprising one or more interface element to submit feedback directed to a healthcare provider, an injector, a medication, a device manufacturer, a payor, or a pharmaceutical company. A display may be provided showing feedback to the caregiver from other parties. Such feedback may be from a patient, for example.

FIG. 6A-D illustrate an example user interface 600 associated with the payor profile. The user interface 600 comprises a main interface area 604 in which various displays and user interactions may be implemented. The user interface 600 comprises a bottom menu 610 with a Home element 612, a Dashboard element 614, a Pharmaceutical Companies element 616, a Patients element 618, and a Feedback element 620. Each element may be activated via user input to perform associated functions or displays.

Activation of the Home element 612 may bring the main interface area 604 to a default configuration. The default configuration may show available features of the payor module and user interface 600.

Figure 6A:
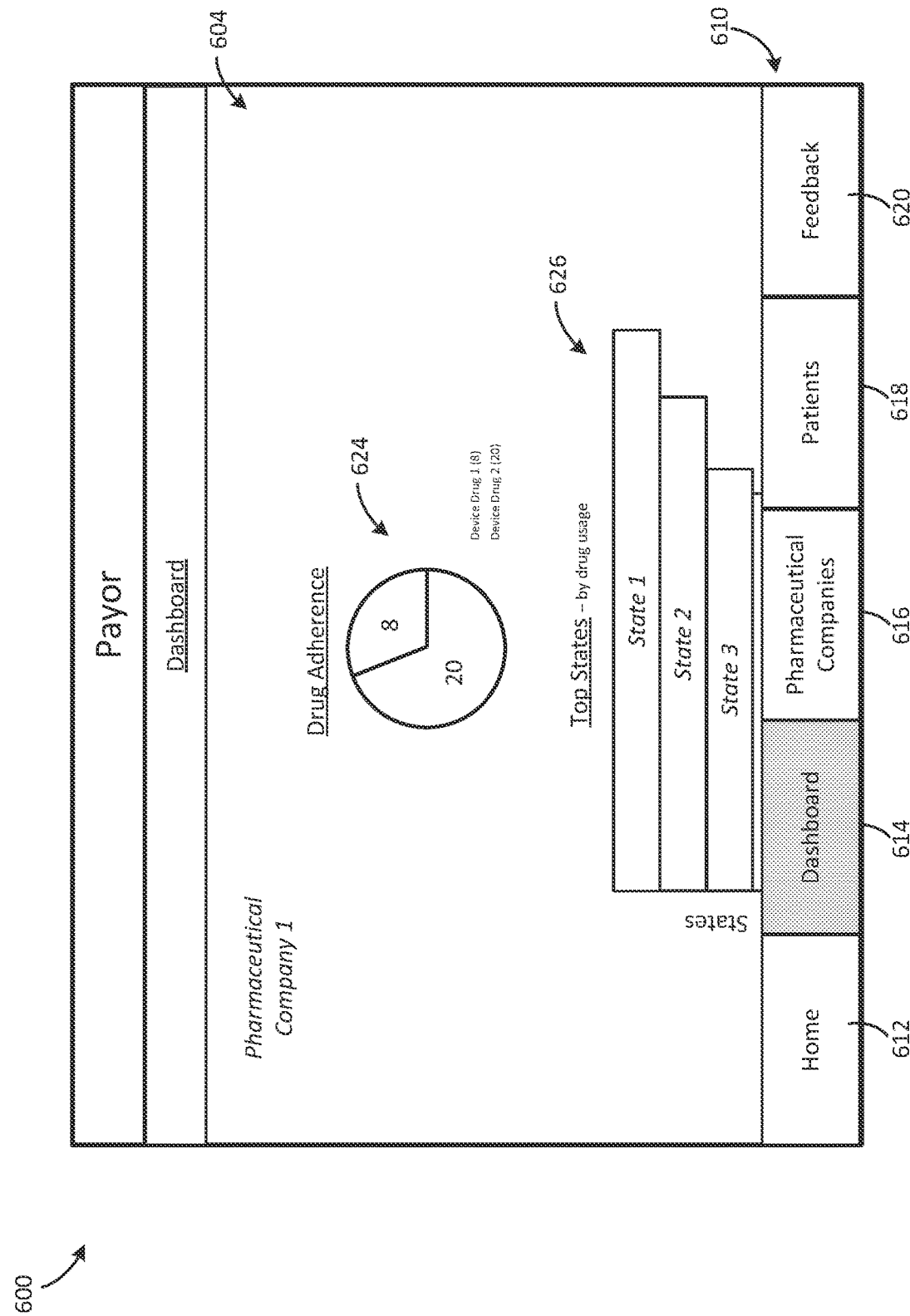

Activation of the Dashboard element 614 may cause display of various informational elements in the main interface area 604. For example, an element of the dashboard may indicate a number of pharmaceutical companies associated with the payor and a number of drugs associated with the payor. As shown in FIG. 6A, an element of the dashboard may comprise a graph, chart, or other type of visual representation indicating the drug adherence for drugs that are also associated with the particular "pharmaceutical company 1." Here, a pie chart 624 is provided that represents the respective drug adherences for device drug 1 and device drug 2 associated with pharmaceutical company 1. An element of the dashboard may indicate a usage, per state or country, of the drug or drugs associated with pharmaceutical company 1 (e.g., device drug 1 and/or device drug 2). In the example in FIG. 6A, a bar graph 626 is provided that indicates the top states by drug usage. An element of the dashboard may indicate usage statistics. The usage statistics may be based on anonymous data from patients or personally-identifiable data from patients.

Figure 6B:
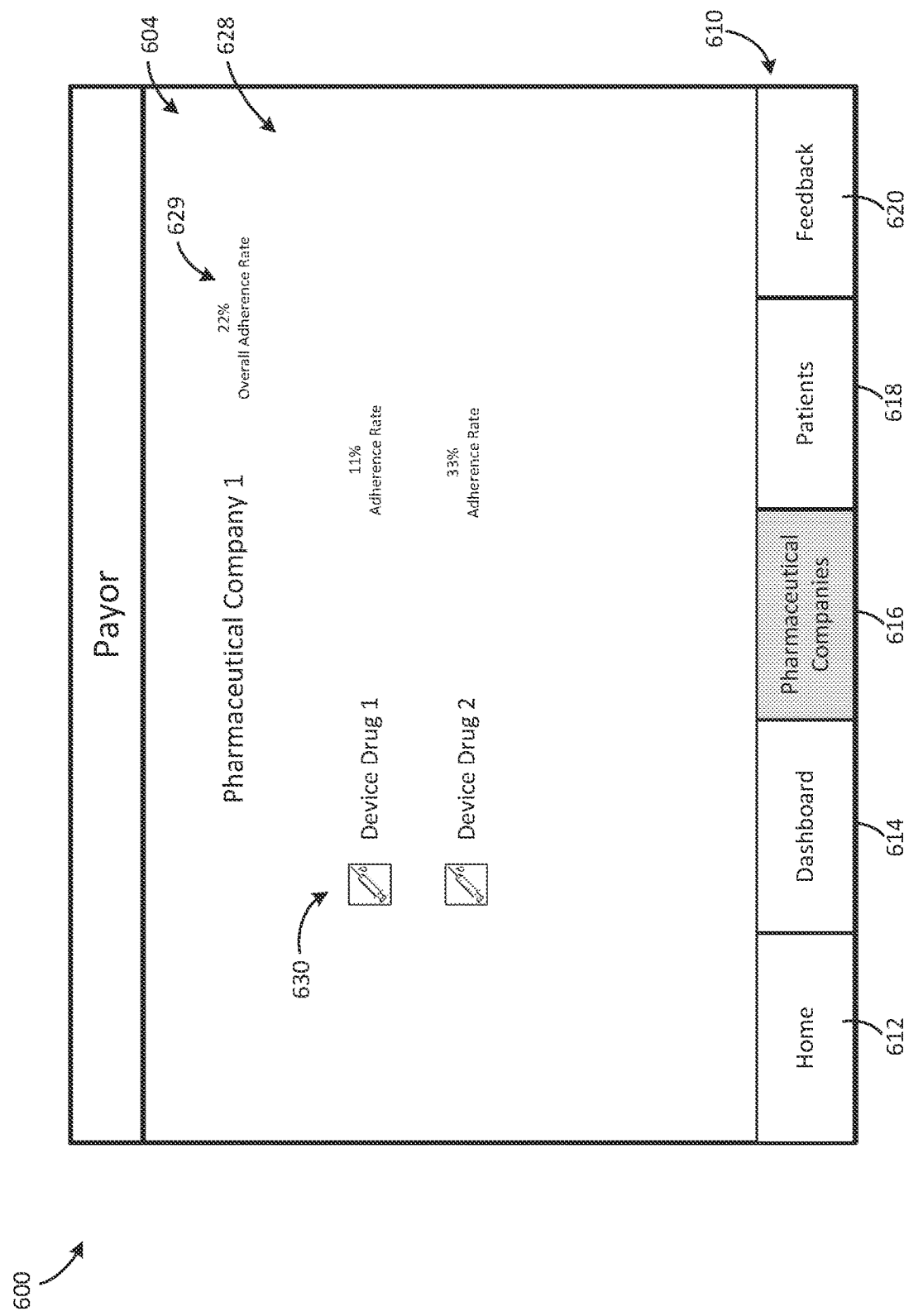

Activation of the Pharmaceutical Companies element 616 may facilitate displays and functions relating to pharmaceutical companies associated with the payor. A display may be provided comprising a list of pharmaceutical companies. A pharmaceutical company may be selected to provide a display for the selected pharmaceutical company. An example pharmaceutical company display 628 is shown in FIG. 6B. The pharmaceutical company display 628 comprises a listing 630 of one or more drugs associated with the pharmaceutical company. In each row of the listing 630, a picture or icon of a device associated with the drug and an adherence rate are provided. The pharmaceutical company display 628 further indicates an overall adherence rate 629 for the pharmaceutical company generally, such as an average adherence rate across the pharmaceutical company's various drugs.

Figure 6C:
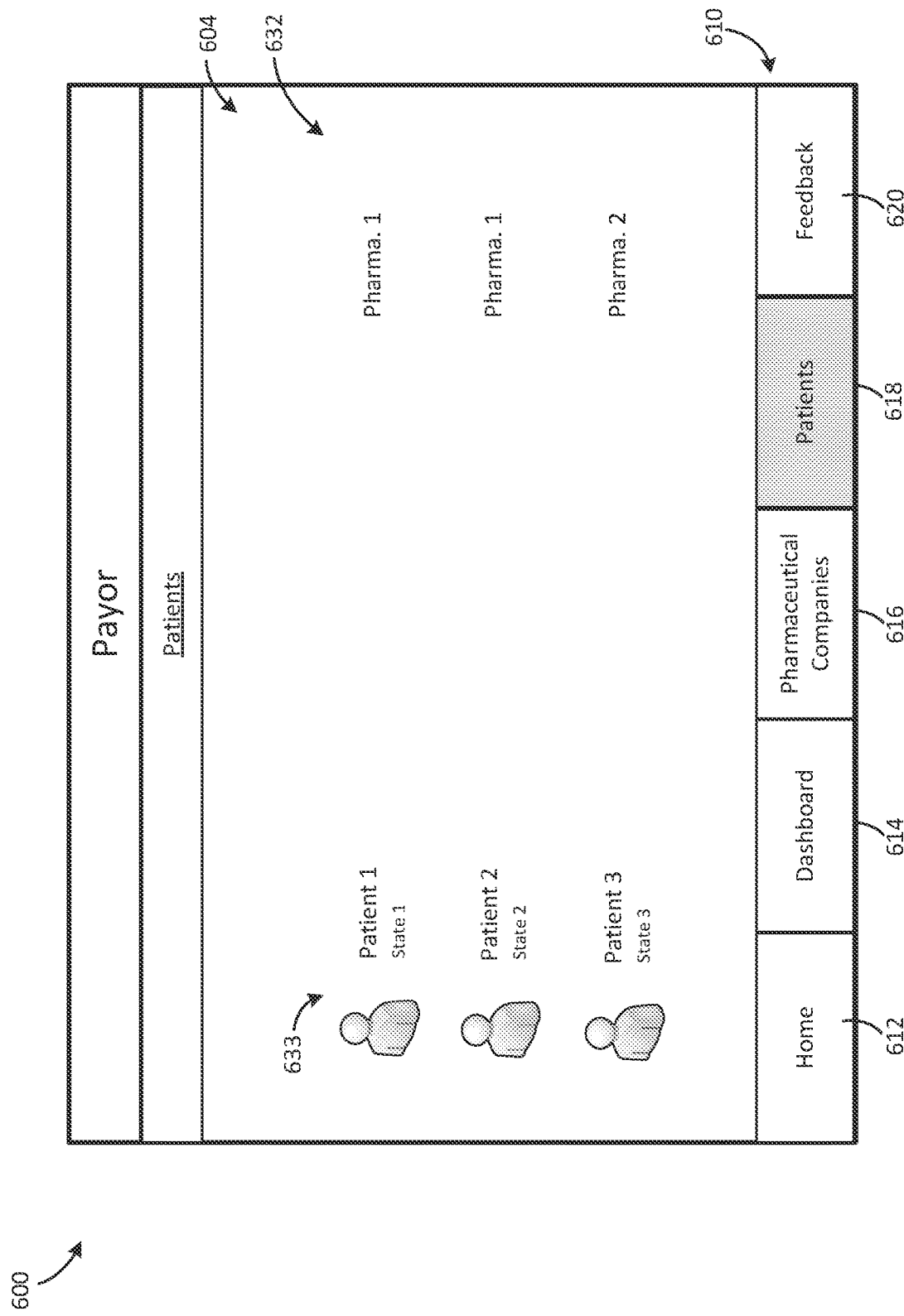
Figure 6D:
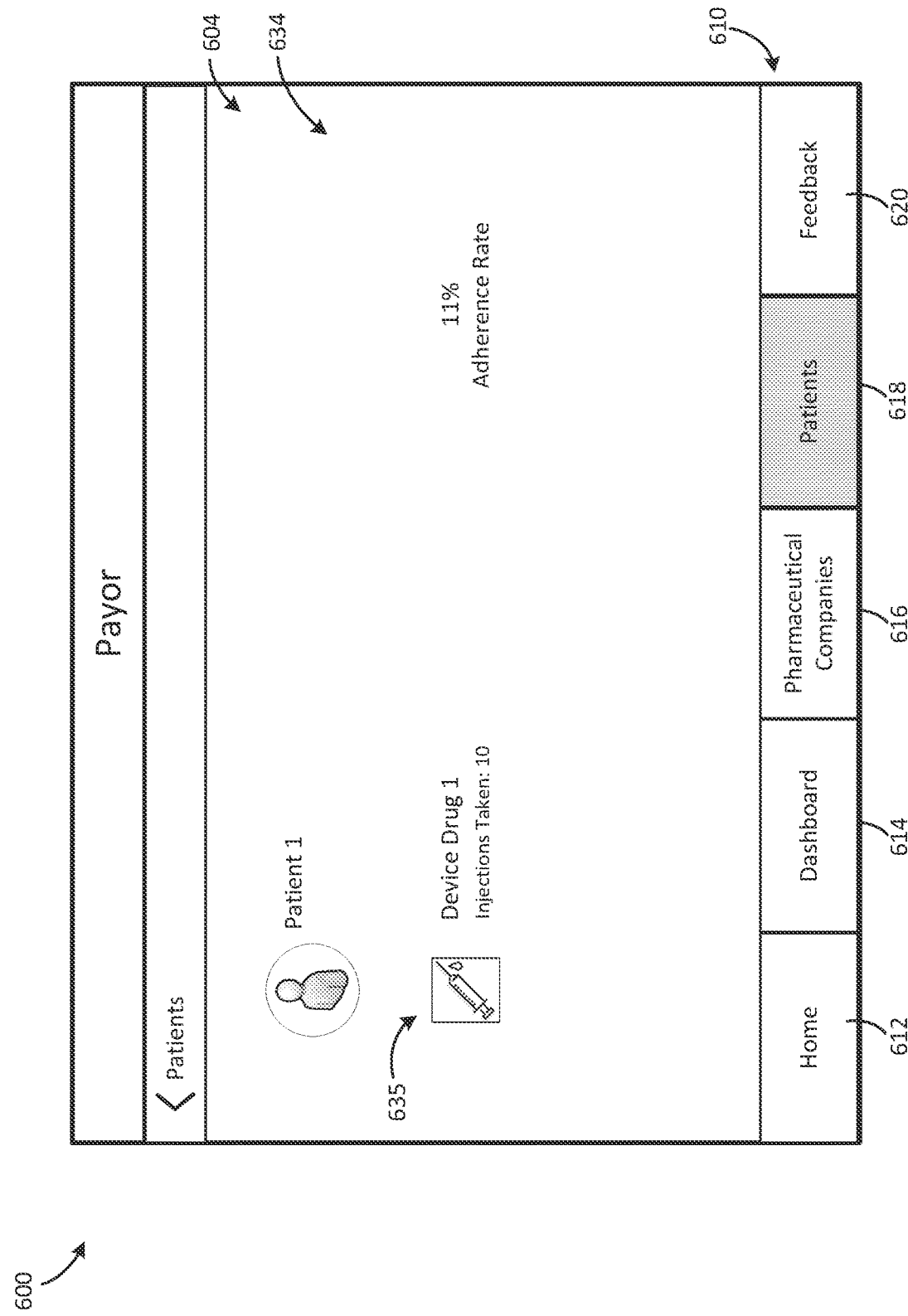

Activation of the Patients element 618 may facilitate displays and functions relating to patients associated with the payor. The patients may be members of an insurance or benefits plan of the payor. As shown in FIG. 6C, an example patients display 632 comprises a listing of patients, with each row identifying the respective patient and an associated pharmaceutical company. A patient from the list may be selected to provide a patient display 634, shown in FIG. 6D, for the selected patient. The patient display 634 for the selected patient may indicate the patient's information, a listing 635 of one or more devices (e.g., injectors) used by the patient, and the patient's adherence rate for each device.

Activation of the Feedback element 620 may facilitate displays and functions relating to feedback to the payor from various parties, such as patients, caregivers, or healthcare providers. A display may be provided indicating said feedback from the various parties. A display may be provided for the user to submit feedback on the user interface 600 and/or the pharmaceutical company module enabling the user interface 600.

FIGS. 7A-E illustrate an example user interface 700 associated with the device manufacturer profile. The user interface 700 comprises a main interface area 704 in which various displays and user interactions may be implemented. The user interface 700 comprises a side menu 730 having a Home element 732, a Dashboard element 734, a Device Management element 736, a User Management element 738, and a Community Voices element 740. Each element may be activated via user input to perform associated functions or displays.

Activation of the Home element 732 may bring the main interface area 704 to a default configuration. The default configuration may show available features of the device manufacturer module and the user interface 700.

Figure 7A:
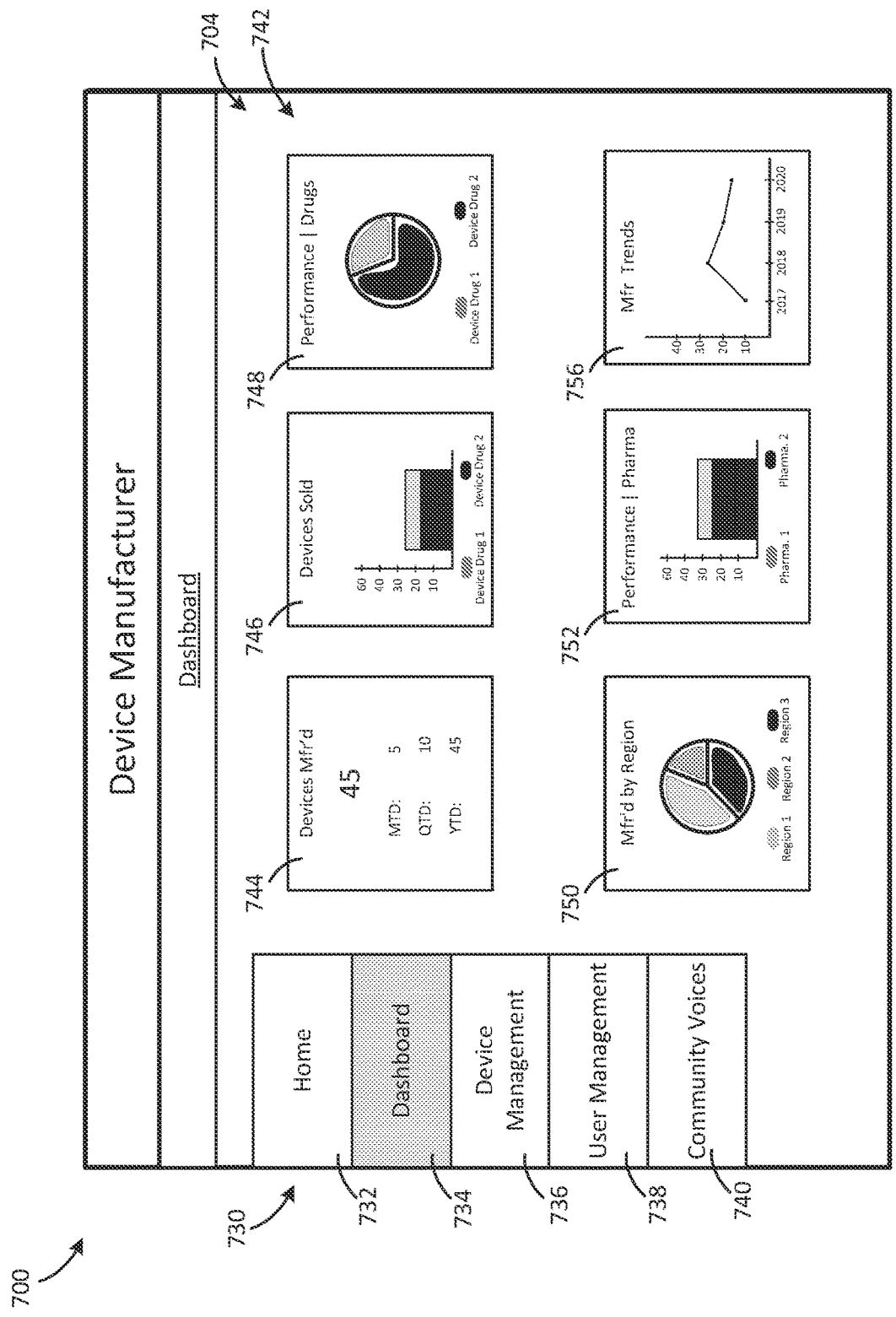
Figure 7B:
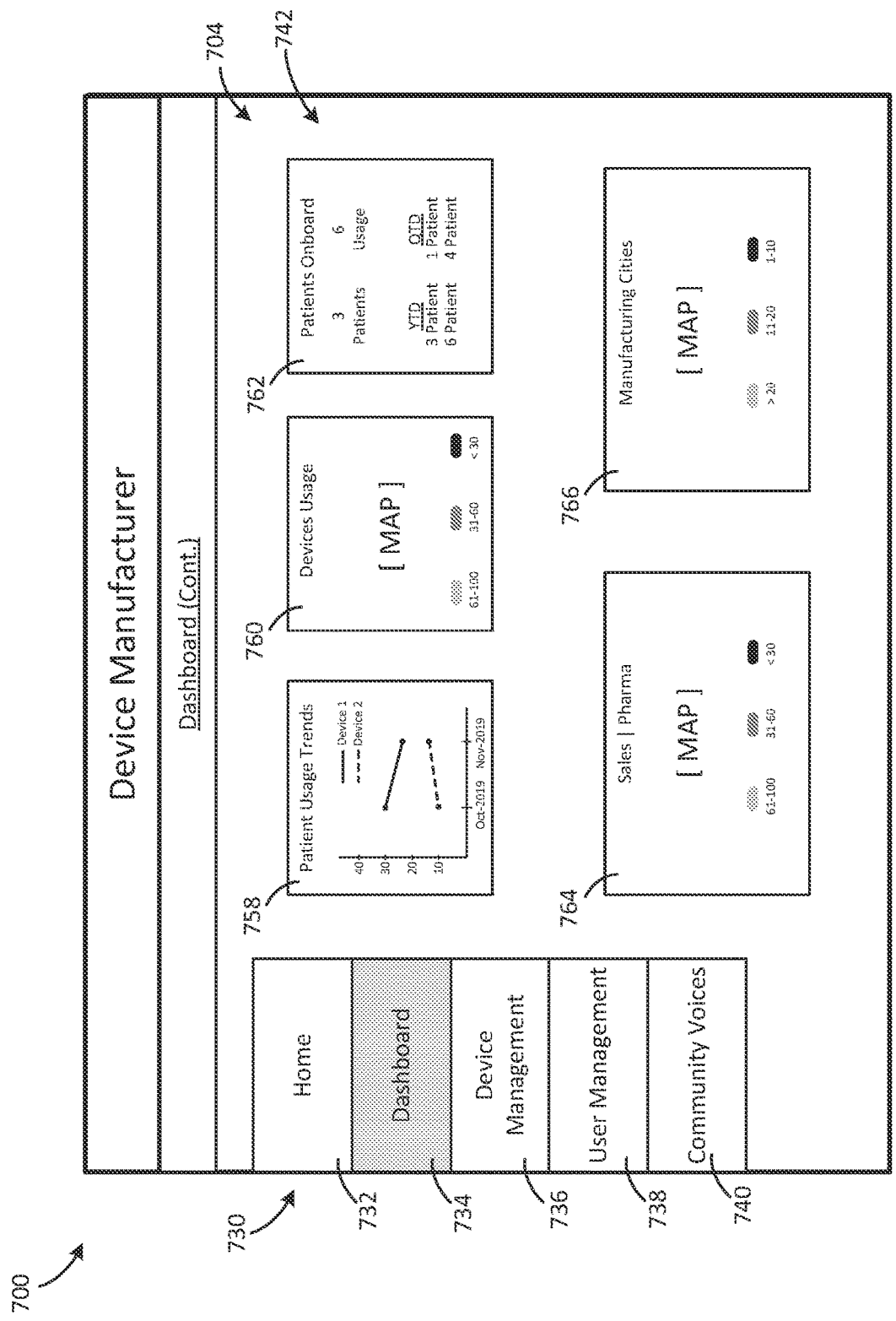

Activation of the Dashboard element 734 may cause display of various informational elements in a dashboard display 742 in the main interface area 704, as shown in FIG. 7A and continued in FIG. 7B. A Devices Manufactured element 744 indicates the total number of devices manufactured by the device manufacturer on a month-to-date basis, quarter-to-date basis, and year-to-date basis. A Devices Sold element 746 indicates the number of devices sold by type (e.g., those administering device drug 1 and those administering device drug 2), such as via the shown bar graph. A Performance Drugs element 748 indicates relative performance metrics of devices by type (e.g., those administering device drug 1 and those administering device drug 2), such as via the shown pie chart. A Manufactured by Region element 750 indicated the number of devices manufactured by the device manufacturer according to region (e.g., regions 1, 2, and 3), such as via the shown pie chart. A Performance|Pharma element 752 indicates performance metrics associated with one or more respective pharmaceutical companies (e.g., pharma 1 and pharma 2), such as via the shown bar graph. A Manufacturer Trends element 756 indicates manufacturing trends (e.g., with respect to the number devices sold or manufactured from year to year), such as via the shown line graph.

Referring to FIG. 7B, a Patient Usage Trends element 758 indicates respective trends associated with patient usage of one or more devices manufactured (e.g., device 1 and device 2), such as via the shown line graph. Patient usage in this context may refer to adherence rate. A Devices Usage element 760 indicates device usage on a country-by-country (or other type of region) basis, such as via a color-coded map represented in FIG. 7B by "[MAP]". A Patients Onboard element 762 indicates the number of patients and device usage associated with the device manufacturer (or a particular device), including as an overall basis, a year-to-date basis, a quarter-to-date basis, or a month-to-date basis (not shown). A Sales|Pharma element 764 indicates the number of devices sold on a country-by-country (or other type of region) basis, such as via a color-coded map represented in FIG. 7B by "[MAP]". A Manufacturing Cities element 766 indicates the number of devices manufactured on a city basis, such as via a color-coded map represented in FIG. 7B by "[MAP]".

Figure 7C:
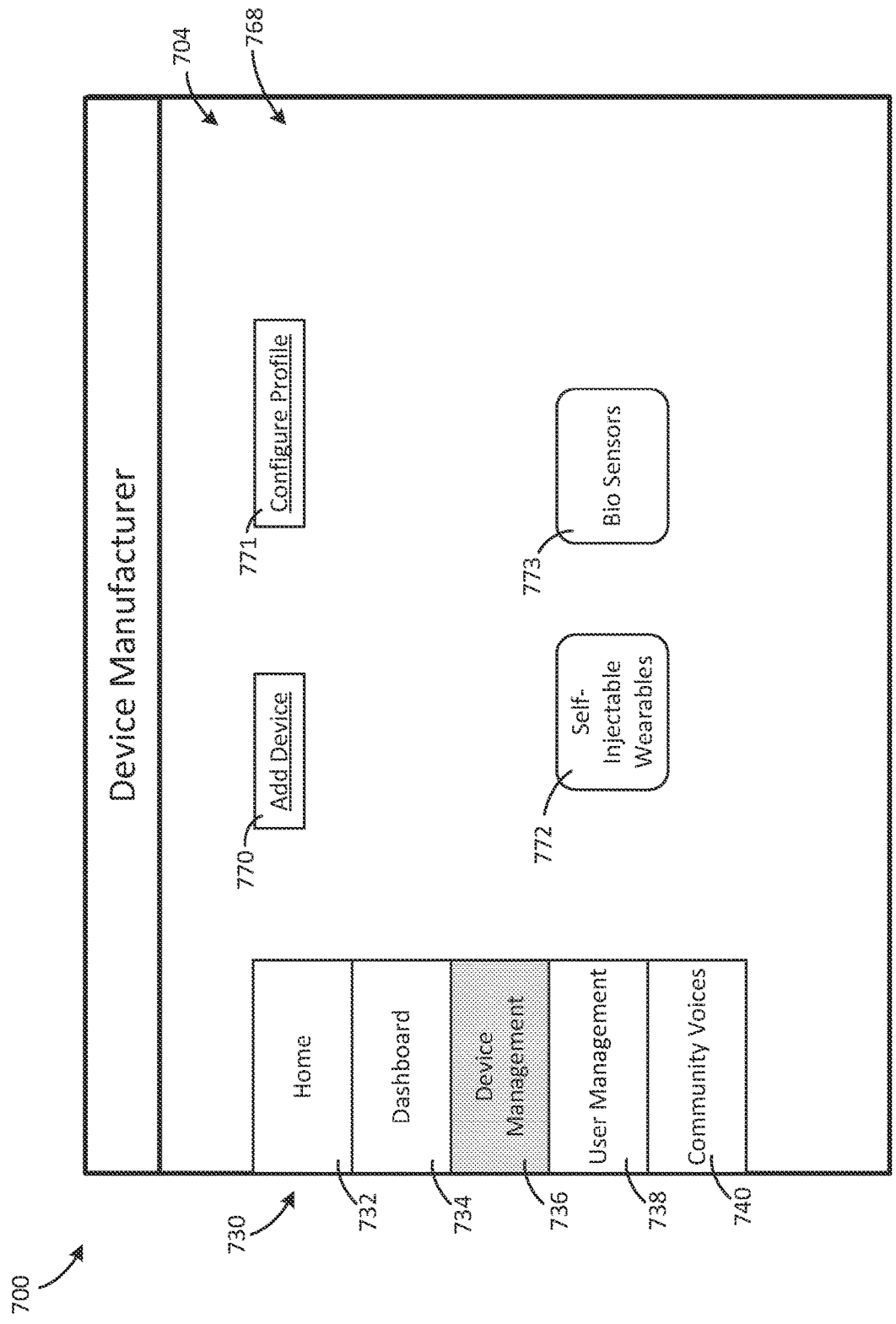
Figure 7D:
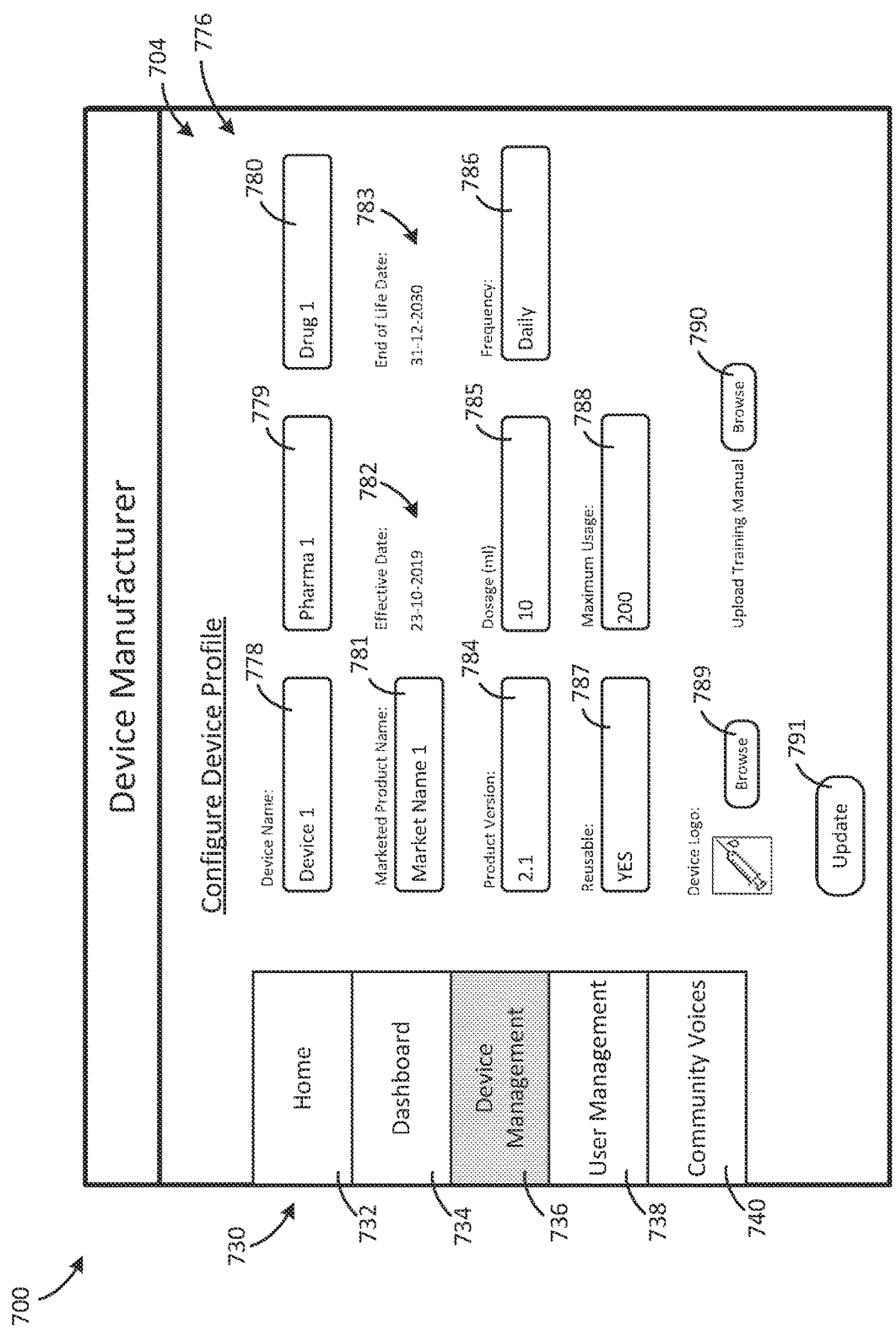
Figure 7E:
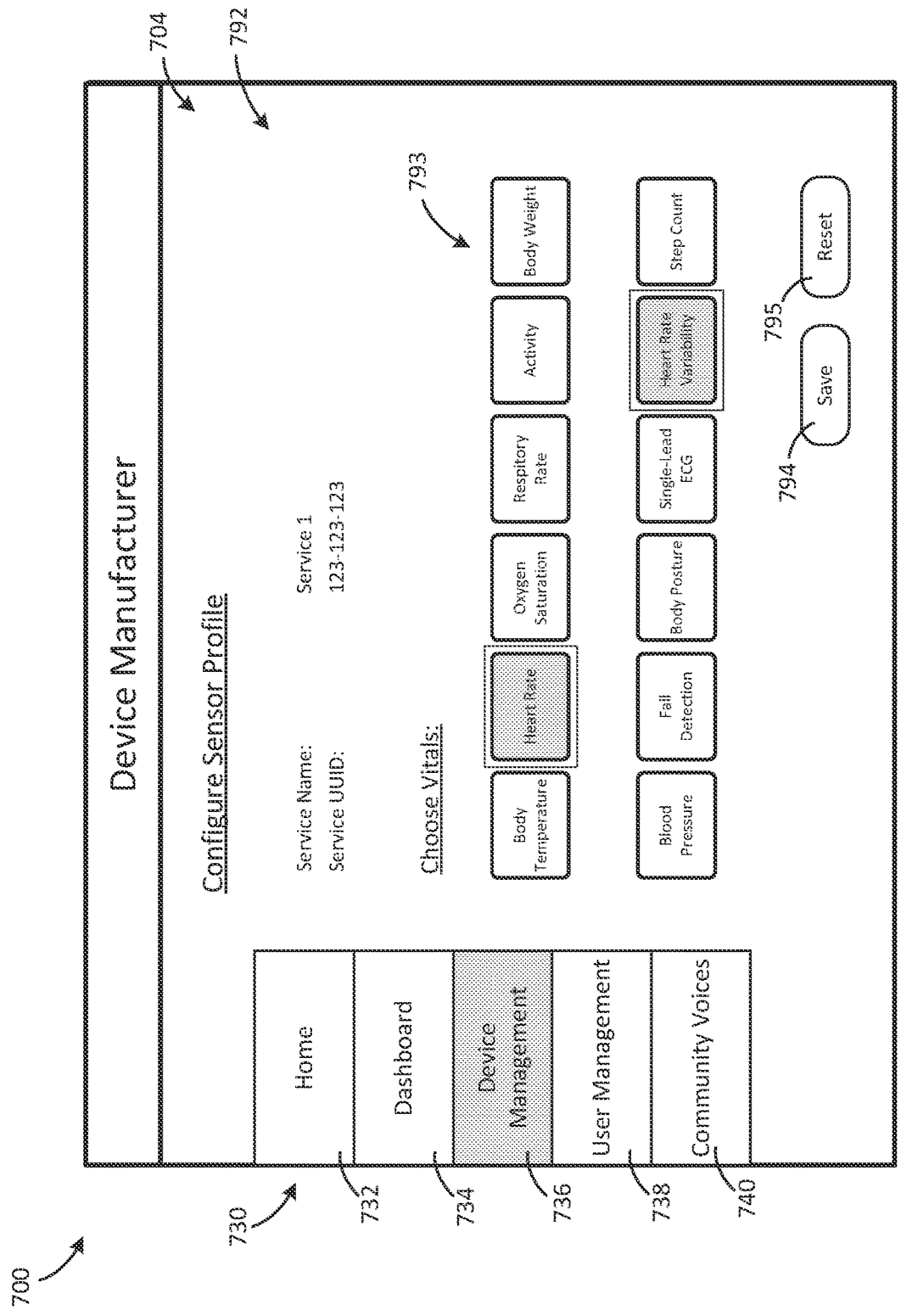

Activation of the Device Management element 736 may facilitate displays and functions associated with devices and sensors (e.g., devices and/or sensors manufactured by the device manufacturer), such as a device display 768 shown in FIG. 7C. The device display 768 comprises an Add Device element 770, and a Configure Profile element 771. The device display 768 further comprises a Self-Injectable Wearables element 772 and a Bio Sensors element 773.

The Configure Profile element 771 may be activated to open a display for editing a profile associated with a device (e.g., injector) or a sensor configured to monitor a physiological characteristic of a patient. For example, the Configure Profile element 771 may be activated to display a Configure Device Profile display 776 shown in FIG. 7D for editing a profile of a device. Additionally or alternatively, the Configure Profile element 771 may be activated to display a Configure Sensor Profile display 792 shown in FIG. 7E for editing a profile of a sensor. As an example, the Self-Injectable Wearables element 772 may be activated to display a listing of available devices. A device may be selected from the listing and the Configure Profile element 771 may be activated to open the Configure Device Profile display 776 to edit the selected device's profile. Similarly, the Bio Sensors element 773 may be activated to display a listing of available sensors. A sensor may be selected from the listing and the Configure Profile element 771 may be activated to open the Configure Sensor Profile display 792 to edit the selected sensor's profile.

The Configure Device Profile display 776 comprises a plurality of editable fields, including a Device Name field 778 indicating a device's name, a Drug field 780 indicating a drug administered by the device, a Pharmaceutical field 779 indicting the pharmaceutical company associated with the drug, a Marketed Product Name field 781 indicating the device's name on the market, a Product Version field 784 indicating the product version of the device, a Dosage field 785, a Frequency field 786 indicating a frequency that the device should be used to administer the drug, a Reusable field 787 indicating whether the device is reusable or not, and a Maximum Usage field 788 indicating the maximum number of usages of the device. The Configure Device Profile display 776 further comprises an Effective Date element 782 to indicate an effective date of the device and an End of Life Date element 783 to indicate an end of life of the device. The Effective Date element 782 and the End of Life Date element 783 may be non-editable. The Configure Device Profile display 776 further comprises a Device Logo element 789 which may be activated to upload or otherwise define a logo associated with the device and a Training Manual element 790 which may be activated to upload or otherwise define a training manual for the device. The Configure Device Profile display 776 further comprises an Update element 791 to save any changes to the device's profile.

The Configure Sensor Profile display 792 initially indicates a name and UUID of a service associated with the sensor. The Configure Sensor Profile display 792 further comprises a plurality of selectable physiological characteristics 793. The physiological characteristic associated with the sensor may be selected from the plurality of physiological characteristics 793. Those selected may be the physiological characteristics that the sensor is configured to monitor and report. A Save element 794 is provided to save the sensor profile and a Reset element 795 is provided to reset the profile to a default state.

Referring again to FIG. 7C, the Add Device element 769 may be activated to add or define a device (or sensor) within the system. For example, the Add Device element 769 may be activated to open a display similar to the Configure Device Profile display 776 in FIG. 7D or the Configure Sensor Profile display 792 in FIG. 7E except that none of the fields are populated with existing information and must be instead entered from scratch.

Activation of the User Management element 738 may facilitate displays and functions associated with the users of the device manufacturer's devices. A display may be provided that comprises a list of users. A user entry in the list may indicate a device and/or sensor of the user. A user may be selected from the list to provide a display with information on the selected user. Said information may be editable.

Activation of the Community Voices element 740 may facilitate displays and functions associated with the community of patients using the device manufacturer's devices. A display may be provided that indicates feedback statistics of the community of patients. Feedback statistics may be organized according to device type.

Figure 8A:
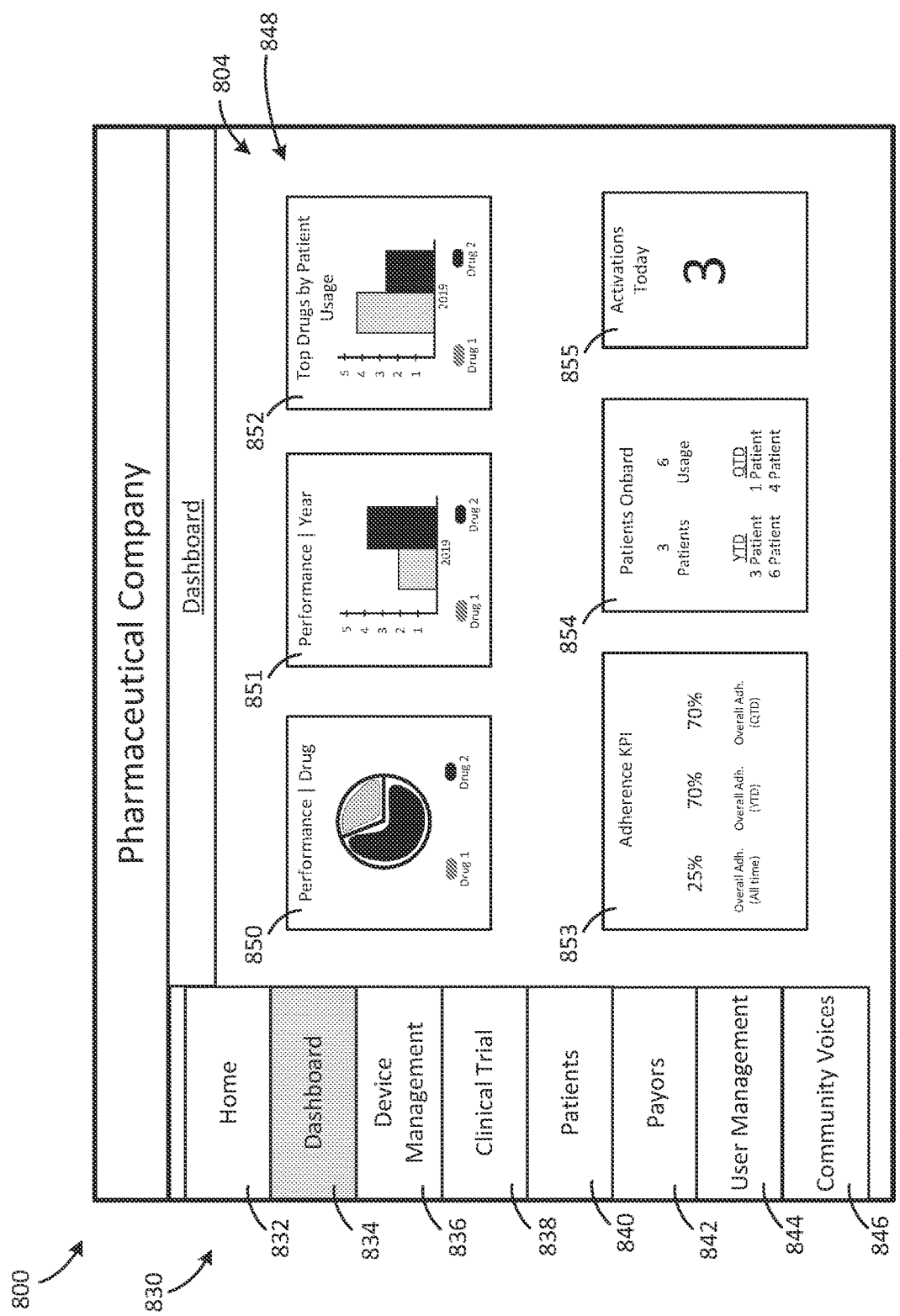
Figure 8B:
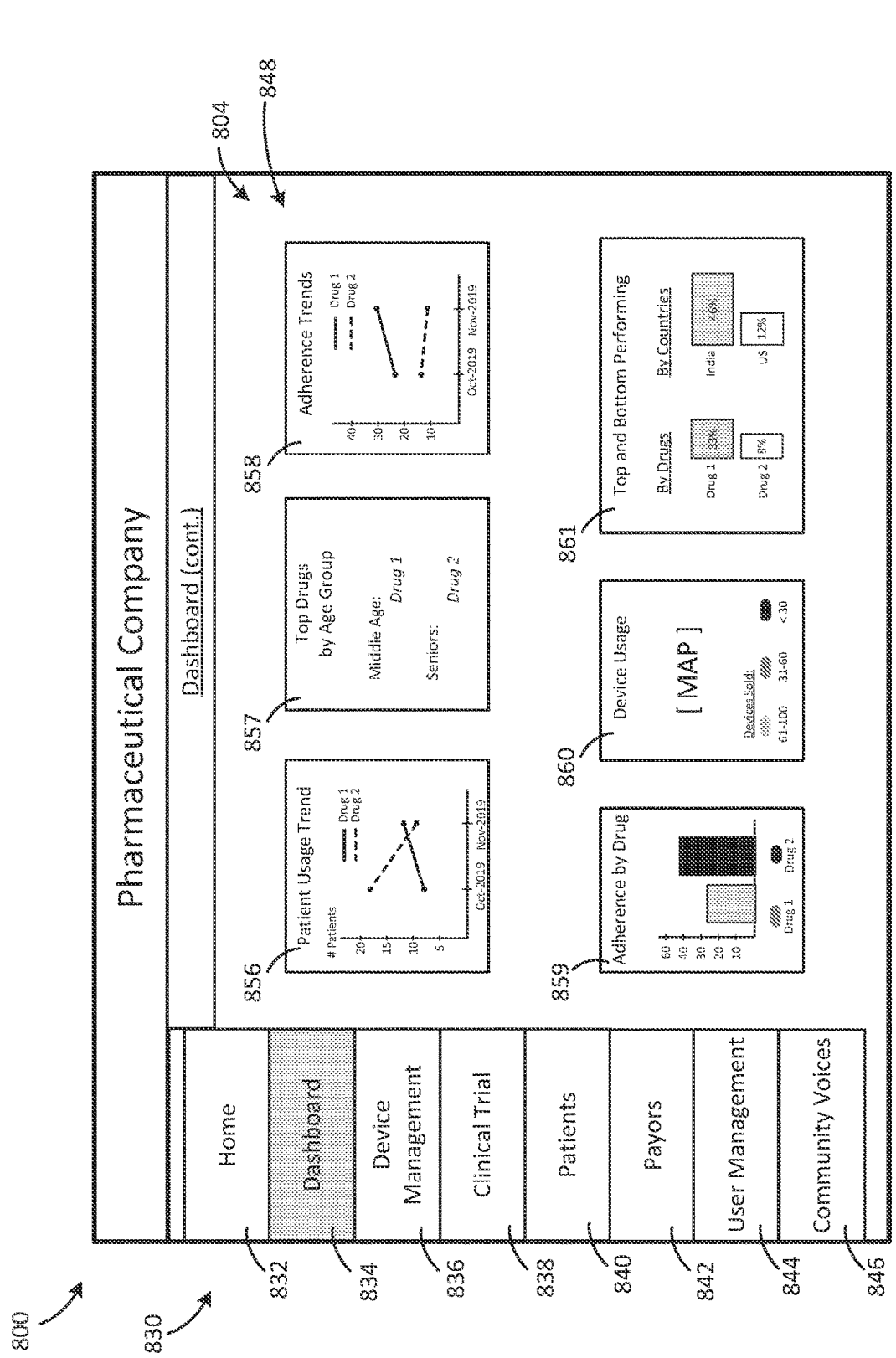
Figure 8C:
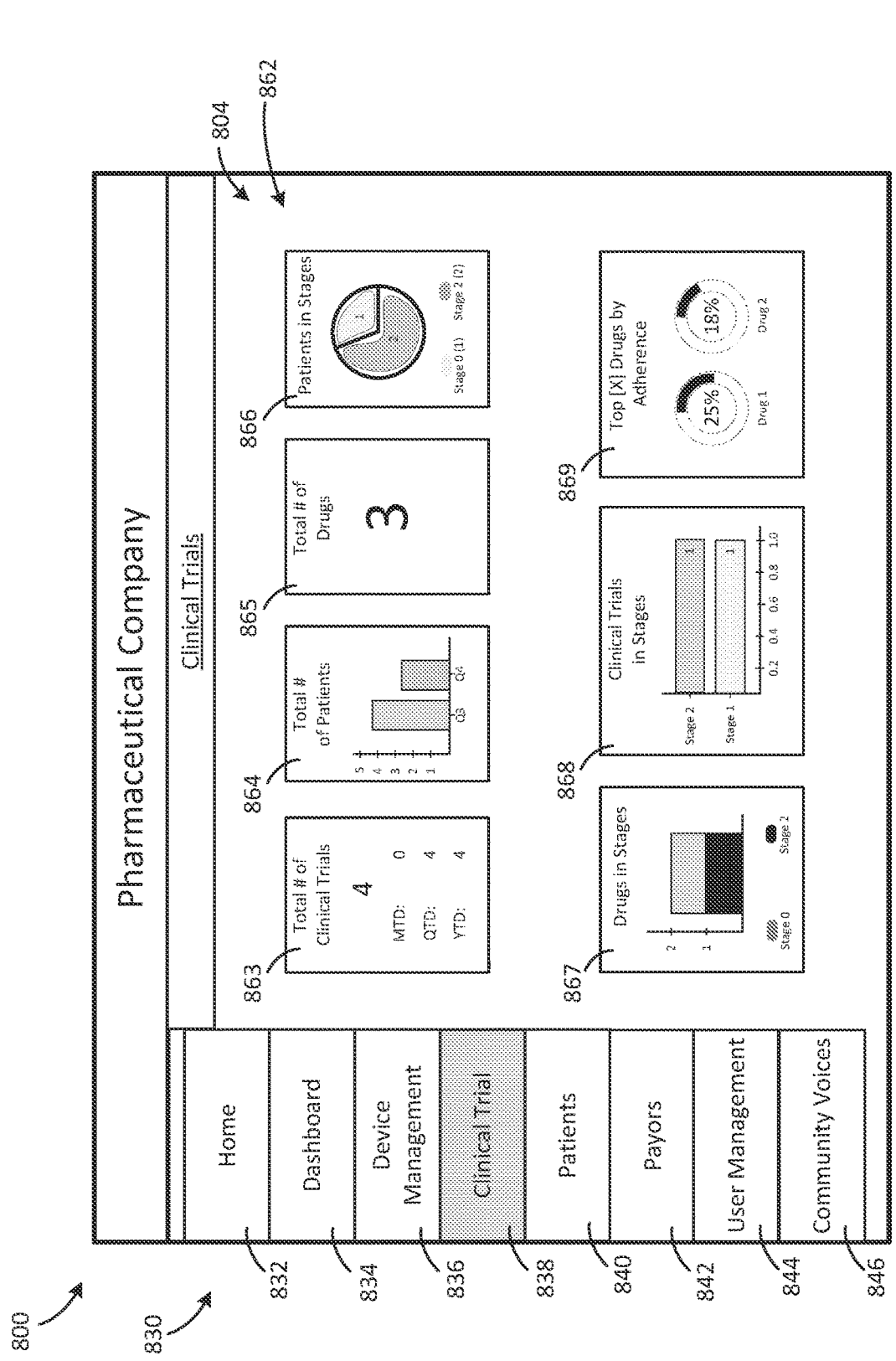

FIGS. 8A-C illustrate an example user interface 800 associated with the pharmaceutical company profile. The user interface 800 comprises a main interface area 804 in which various displays and user interactions may be implemented. The user interface 800 comprises a side menu 830 having a Home element 832, a Dashboard element 834, a Device Management element 836, a Clinical Trial element 838, a Patients element 840, a Payors element 842, a User Management element 844, and a Community Voices element 846. Each element may be activated via user input to perform associated functions or displays.

Activation of the Home element 832 may bring the main interface area 804 to a default configuration. The default configuration may show available features of the pharmaceutical company module and the user interface 800.

Activation of the Dashboard element 834 may cause display of various informational elements in a dashboard display 848 in the main interface area 804, as shown in FIG. 8A and continued in FIG. 8B. A Performance|Drug element 850 indicates the relative performances (e.g., by sales) of drug 1 and drug 2, such as via the shown pie chart. A Performance|Year element indicates the respective performances (e.g., by sales) of drug 1 and drug 2, such as via the shown bar graph. A Top Drugs by Patient Usage element 852 indicates, in descending order, the patient usage of drug 1 and drug 2, such as via the shown bar graph. An Adherence KPI element 853 indicates one or more KPI (key performance indicators) associated with one or more drugs of the instant pharmaceutical company. Here, the Adherence KPI element 853 indicates all-time adherence rate, a year-to-date adherence rate, and a quarter-to-date adherence rate. A Patients Onboard element 854 indicates the number of patients using drugs associated with the instant pharmaceutical company and the number of usages of those drugs, including as an overall basis, a year-to-date basis, a quarter-to-date basis, or a month-to-date basis (not shown). An Activations Today element 855 indicates the number of activations for the current day, such as the number of activations of devices configured to administer a drug associated with the instant pharmaceutical company.

Referring to FIG. 8B, a Patient Usage Trend element 856 indicates respective trends associated with patient usage of drug 1 and drug 2, such as via the shown line graph. A Top Drugs by Age Group element 857, indicates the top drug associated with the instant pharmaceutical company for each or one or more designated age groups (e.g., youth, middle age, seniors, etc.). An Adherence Trends element 858 indicates respective trends associated with patient adherence rates for drug 1 and drug 2, such as via the shown line graph. An Adherence by Drug element 859 indicates respective adherence rates for drug 1 and drug 2, such as via the shown bar graph. A Device Usage element 860 indicates device usage on a country-by-country (or other type of region) basis, such as via a color-coded map represented in FIG. 8B by "[MAP]". A Top and Bottom Performing element 861 indicates the top performing drug (drug 1) associated with the pharmaceutical company and the bottom performing drug (drug 2) associated with the pharmaceutical company, such as via the shown (labelled) bar representations. The Top and Bottom Performing element 861 further indicates the top performing country (India) and the bottom performing country (US), such as via the shown (labelled) bar representations. "Performance" here may refer to a percentage of the total sales out of all drugs associated with the pharmaceutical company.

Activation of the Device Management element 836 may facilitate displays and functions relating to devices (e.g., injectors) configured to deliver a drug of the pharmaceutical company. A display may be provided comprising a list of devices. A device entry in the list may indicate if the device is active. A device entry may be selected to view and/or edit various settings of the selected device.

Activation of the Clinical Trial element 838 may facilitate displays and functions relating to clinical trials of devices (e.g., injectors) configured to deliver a drug of the pharmaceutical company. For example, a display may be provided that indicates one or more patients participating in a clinical trial and their respective adherence rates. As another example, a display may be provided that indicates trial records.

As shown in FIG. 8C, activation of the Clinical Trial element 838 may additionally or alternatively cause display of various informational elements in a clinical trials display 862 in the main interface area 804.

A Total # of Clinical Trials element 863 indicates the total number of ongoing clinical trials associated with the instant pharmaceutical company, which are provided on month-to-date, quarter-to-date, and year-to-date bases. A Total # of Patients element 864 element indicates the total number of patients, per quarter, involved in clinical trials associated with the instant pharmaceutical company, such as via the shown bar graph. A Total # of Drugs element 865 indicates the total number of drugs associated with the instant pharmaceutical company that are undergoing clinical trials. A Patients in Stages element 866 indicates the relative numbers of patients, by clinical trial stage, involved in clinical trials associated with the instant pharmaceutical company, such as via the shown pie chart. A Drugs in Stages element 867 indicates the relative numbers of drugs, by clinical trial stage, associated with the instant pharmaceutical company and undergoing clinical trials, such as via the shown bar graph. Here, two drugs are in stage 0 clinical trials and one drug is in stage 2 clinical trials. A Clinical Trials in Stages element 868 indicates the number of clinical trials, by stage, associated with the instant pharmaceutical company, such as via the shown bar graph. A Top [X] Drugs by Adherence element 869 indicates the top X (e.g., 2, 3, 5, etc.) drugs by adherence rate, as well as their respective adherence rates. Here, the element 869 indicates, via circular charts and text, the top two drugs (drug 1 and drug 2) by adherence rate (25% and 18%, respectively).

Activation of the Patient element 840 may facilitate displays and functions relating to patients associated with the pharmaceutical company, such as patients that are administered a drug from the pharmaceutical company. A display may be provided indicating a list of patients. A patient may be selected from the list to provide a display indicating the patient's information, device(s), and adherence rates for each device.

Activation of the Payor element 842 may facilitate displays and functions relating to payors associated with the pharmaceutical company. A display may be provided to view and/or edit payor information or settings associated with a selected payor. A display may be provided comprising an interface element to add a payor.

Activation of the User Management element 844 may facilitate displays and functions relating to users associated with the pharmaceutical company. User management may refer to users of the user interface 800. A display may be provided to view and/or edit information and settings associated with a selected user.

Activation of the Community Voices element 846 may facilitate displays and functions associated with the community of patients receiving a drug of the pharmaceutical company. A display may be provided indicating feedback statistics of the community of patients. Such feedback statistics may be based on anonymous, aggregated feedback data. Additionally or alternatively, a display may be provided indicating feedback from individual patients, which may or may not be anonymous.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   wirelessly connecting a first mobile device to an injection device and to a sensor;
   displaying a user interface on the first mobile device, wherein the user interface comprises a user interface element configured to enable a patient to selectively start an injection of a medicament or stop the injection of the medicament before the injection is complete;
   receiving, at the first mobile device and from the sensor, a first measurement of a physiological characteristic of the patient determined before the injection of the medicament;
   transmitting, from the first mobile device and to the injection device, an indication that the patient has selected to start the injection of the medicament;
   injecting the medicament to the patient;
   transmitting, from the first mobile device and to the injection device, an indication that the patient has selected to stop the injection of the medicament before the injection is complete;
   stopping the injection of the medicament to the patient;
   receiving, at the first mobile device and from the injection device, an indication that the injection of the medicament to the patient was stopped;
   receiving, at the first mobile device and from the sensor, a second measurement of the physiological characteristic of the patient determined after the injection of the medicament to the patient is stopped;
   transmitting, from the first mobile device and to one or more servers, first injection data including the indication that the injection of the medicament to the patient was stopped, the first measurement of the physiological characteristic of the patient, and the second measurement of the physiological characteristic of the patient; and
   displaying, on the first mobile device, an indication of the progress of the stopped injection of the medicament and the second measurement of the physiological characteristic of the patient.

2. The method of claim 1, wherein wirelessly connecting the first mobile device to the injection device and to the sensor comprises receiving an input, via the user interface of the first mobile device, to wirelessly connect the first mobile device to the injection device and to the sensor.

3. The method of claim 1, wherein receiving the first measurement of the physiological characteristic of the patient comprises receiving an input, via the user interface of the first mobile device, to cause the first measurement of the physiological characteristic of the patient to be received from the sensor.

4. The method of claim 3, wherein receiving the second measurement of the physiological characteristic of the patient comprises receiving an input, via the user interface of the first mobile device, to cause the second-measurement of the physiological characteristic of the patient to be received from the sensor.

5. The method of claim 1, wherein wirelessly connecting the first mobile device to the injection device and to the sensor comprises causing the first mobile device to perform a wireless scan to detect the injection device and the sensor.

6. The method of claim 1, wherein wirelessly connecting the first mobile device to the injection device and the sensor comprises:

determining an identifier associated with the injection medical device; and wirelessly connecting the first mobile device to the injection medical device based on the identifier.

7. The method of claim 1, wherein wirelessly connecting the first mobile device to the injection device and the sensor comprises:

determining an identifier associated with the sensor; and wirelessly connecting the first mobile device to the sensor based on the identifier.

8. The method of claim 1, wherein the physiological characteristic of the patient comprises at least one of heart rate, pulse, blood pressure, oxygen saturation, blood sugar, body temperature, respiratory rate, heart rate variability, step count, a detected patient fall, body posture, body weight, activity level, electrocardiogram data, cough frequency, sneeze frequency, body posture, range of motion, or jaundice.

9. The method of claim 1, further comprising displaying, on the first mobile device, of a listing of a plurality of available injection devices including the injection device.

10. The method of claim 9, further comprising displaying, on the first mobile device, training material for one of the plurality of available injection devices.

11. The method of claim 1, wherein the progress is a time duration of the injection.

12. The method of claim 1, wherein the progress is a percent completion of the injection.

13. The method of claim 12, wherein the percent completion of the injection is graphically illustrated.

14. The method of claim 12, wherein the percent completion of the injection is textually illustrated.

15. The method of claim 1, further comprising displaying, on the first mobile device, an indication of a battery level of the injection device.

16. The method of claim 15, further comprising displaying, on the first mobile device, an indication of whether a safety latch on the injection device is engaged or off.

17. The method of claim 1, wherein displaying the indication of the progress of the stopped injection of the medicament and the second measurement of the physiological characteristic of the patient comprises simultaneously displaying, on the first mobile device:

an identifier of the patient,
an identifier of the injection device,
a battery level of the injection device,
a percent completion of the injection graphically and/or textually, and
a time duration of the injection.

18. The method of claim 1, wherein the injection device adheres to the body of the patient.

19. A non-transitory computer-readable medium storing instructions that, when executed by one or more processors, cause:

wirelessly connecting a first mobile device to an injection device and to a sensor;

displaying a user interface on the first mobile device, wherein the user interface comprises a user interface element configured to enable a patient to selectively start an injection of a medicament or stop the injection of the medicament before the injection is complete;

receiving, at the first mobile device and from the sensor, a first measurement of a physiological characteristic of the patient determined before the injection of the medicament;

transmitting, from the first mobile device and to the injection device, an indication that the patient has selected to start the injection of the medicament;

injecting the medicament to the patient;

transmitting, from the first mobile device and to the injection device, an indication that the patient has selected to stop the injection of the medicament before the injection is complete;

stopping the injection of the medicament to the patient;

receiving, at the first mobile device and from the injection device, an indication that the injection of the medicament to the patient was stopped;

receiving, at the first mobile device and from the sensor, a second measurement of the physiological characteristic of the patient determined after the injection of the medicament to the patient is stopped;

transmitting, from the first mobile device and to one or more servers, first injection data including the indication that the injection of the medicament to the patient was stopped, the first measurement of the physiological characteristic of the patient, and the second measurement of the physiological characteristic of the patient; and displaying, on the first mobile device, an indication of the progress of the stopped injection of the medicament and the second measurement of the physiological characteristic of the patient.

* * * * *